Aug. 13, 1963  R. N. KNOSP ETAL  3,100,406
AUTOMATIC CONTROL APPARATUS FOR SPINDLES
Filed Aug. 22, 1960  11 Sheets-Sheet 9
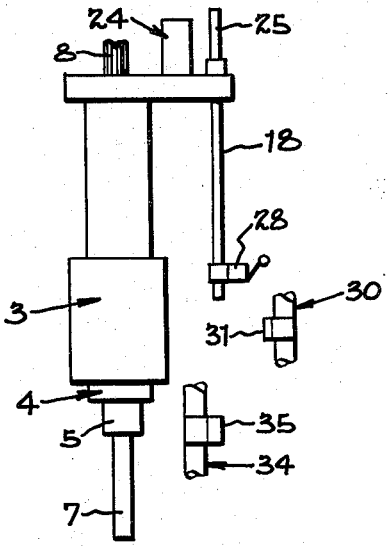
Fig.17
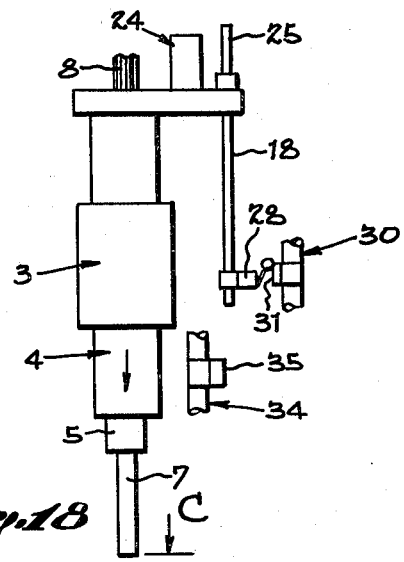
Fig.18
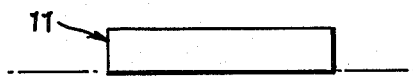
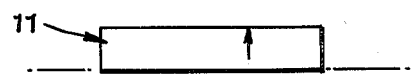
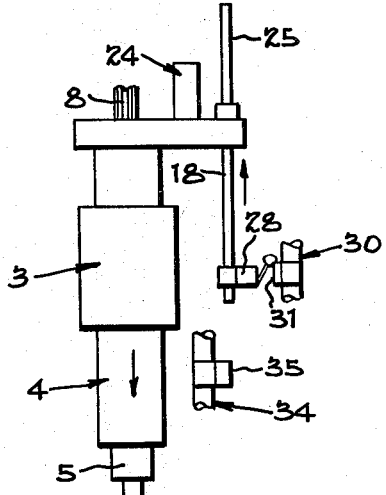
Fig.19
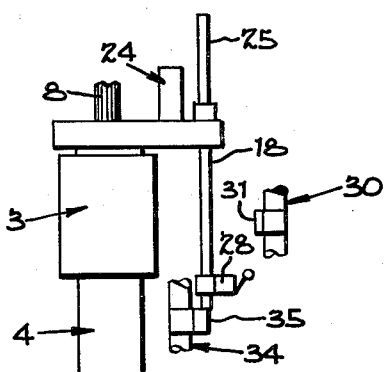
Fig.20
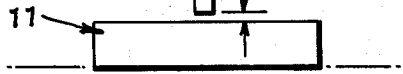
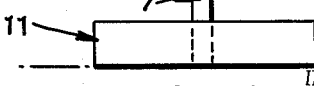
INVENTORS.
Robert N. Knosp.
BY Donald L. Jecks.
Wood, Herron & Evans.
ATTORNEYS.

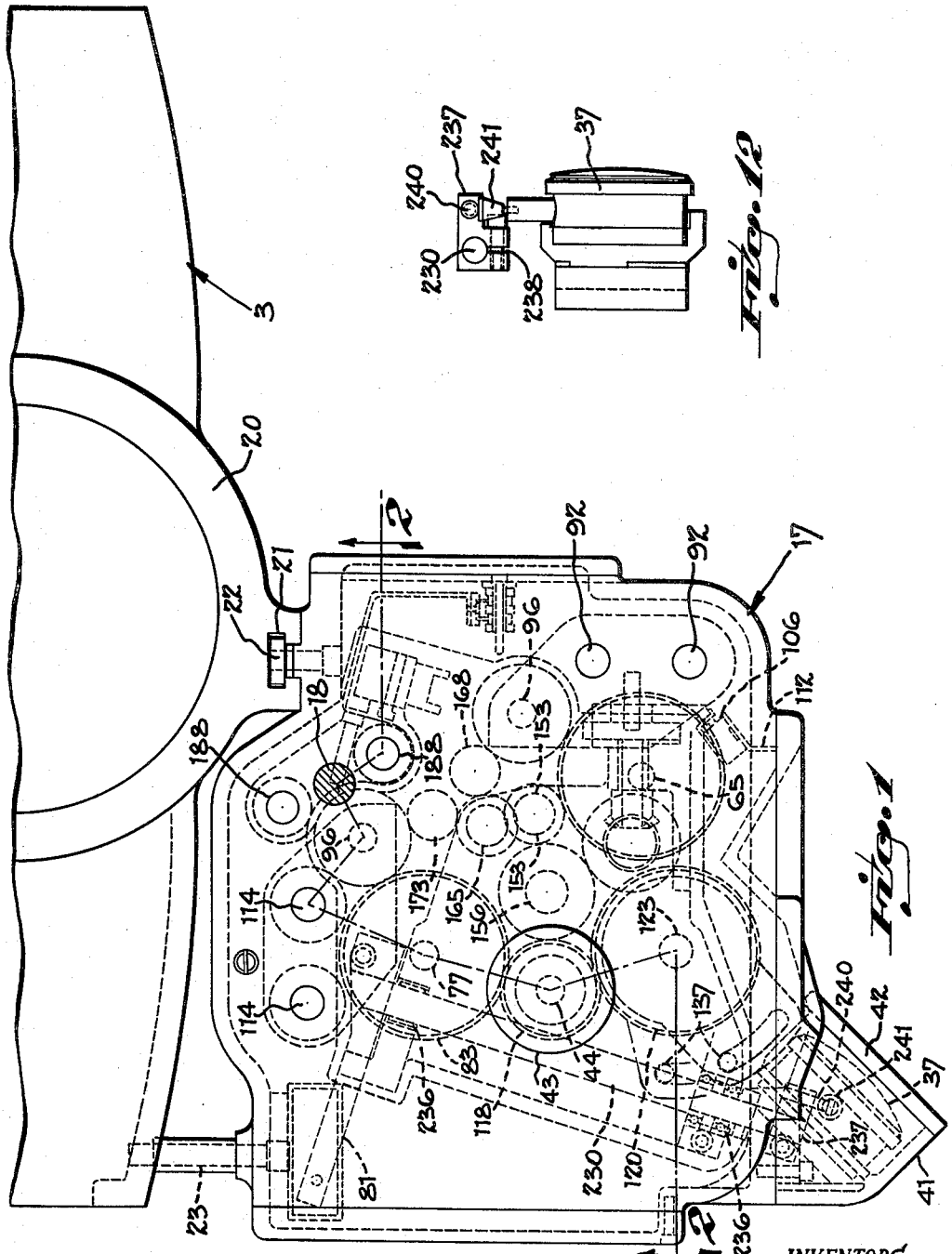

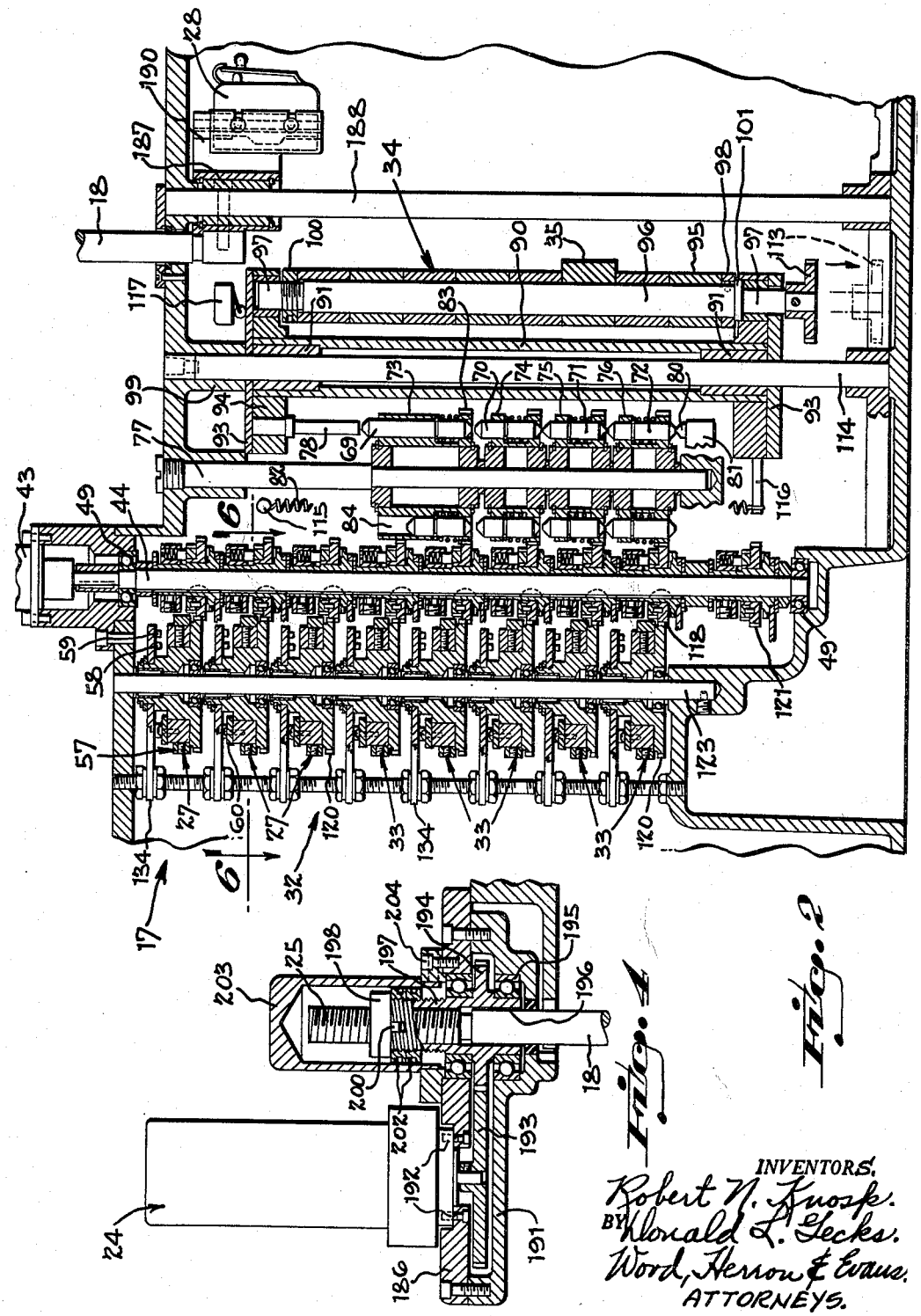

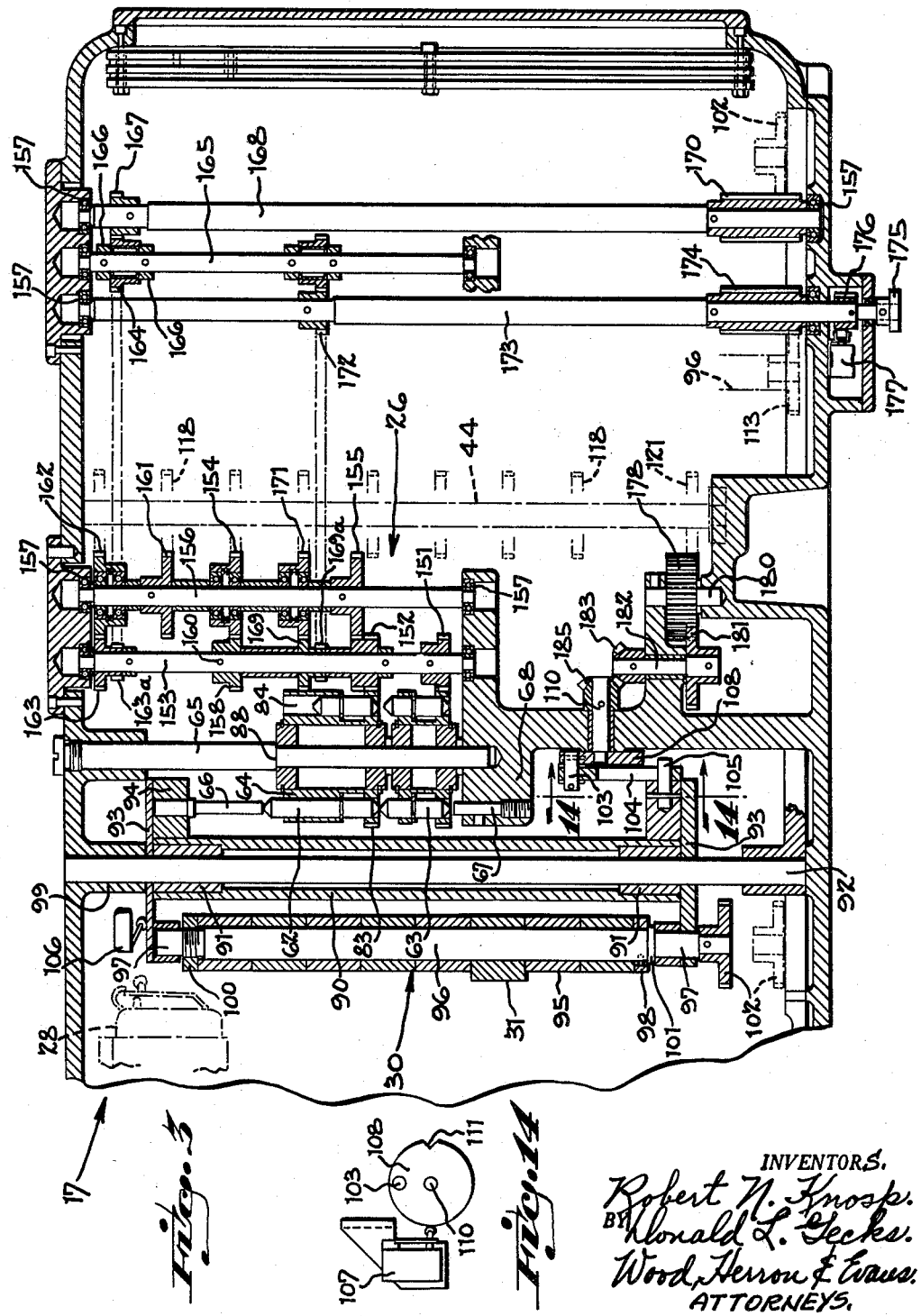

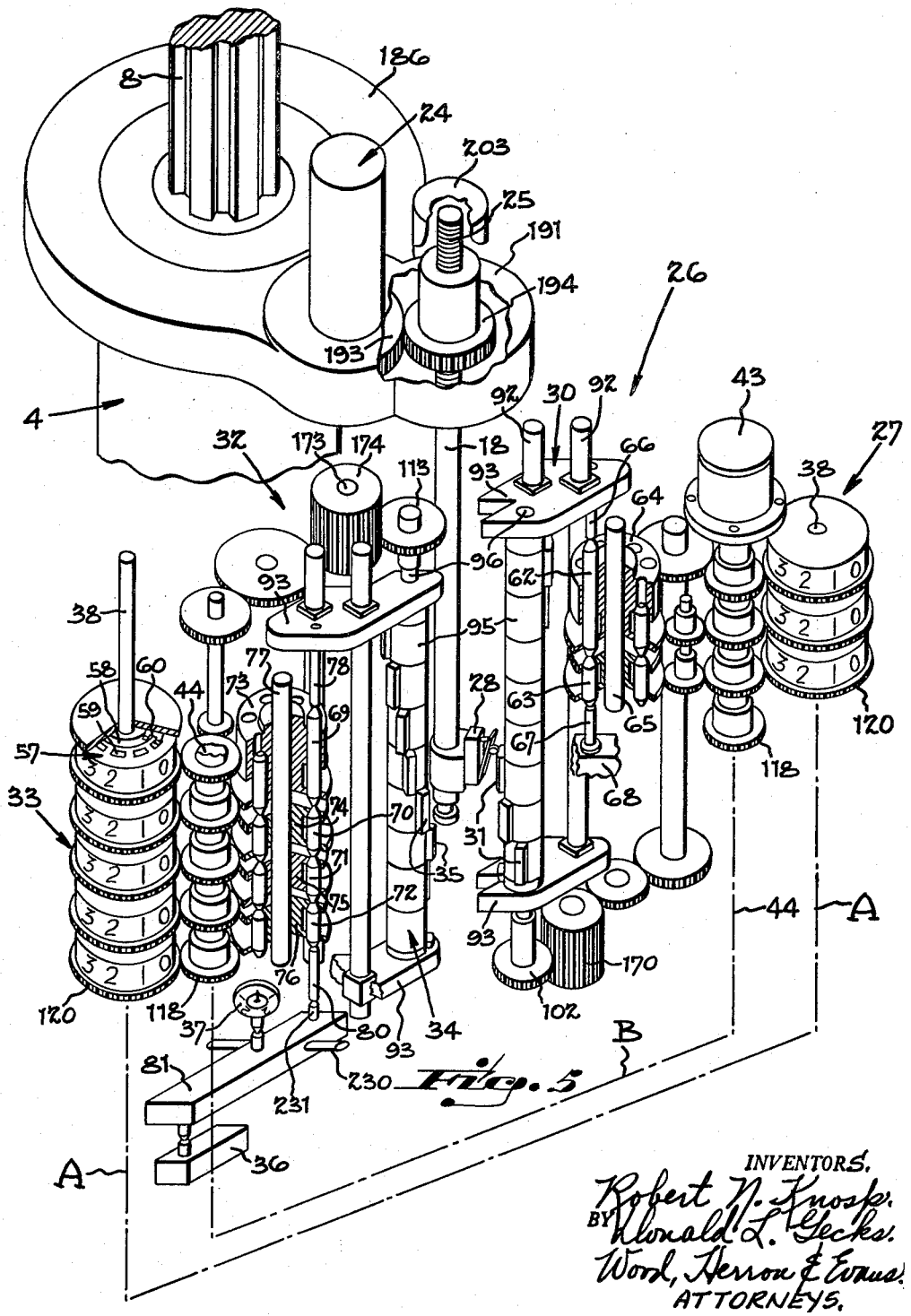

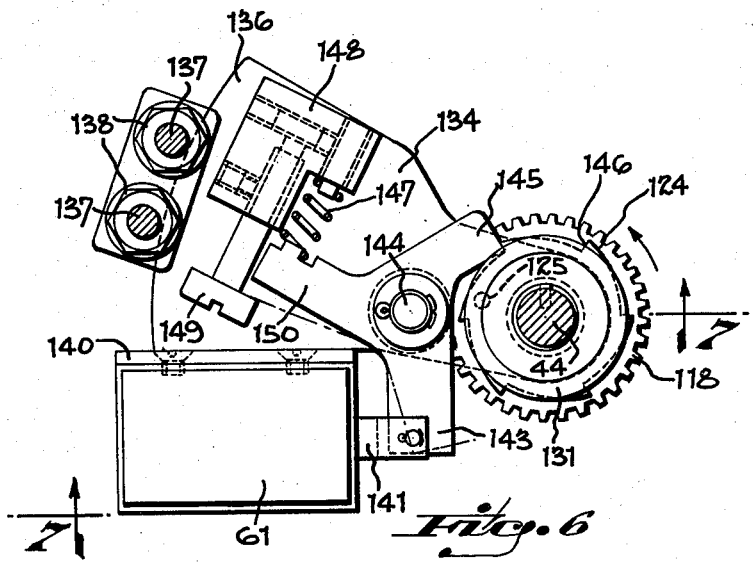
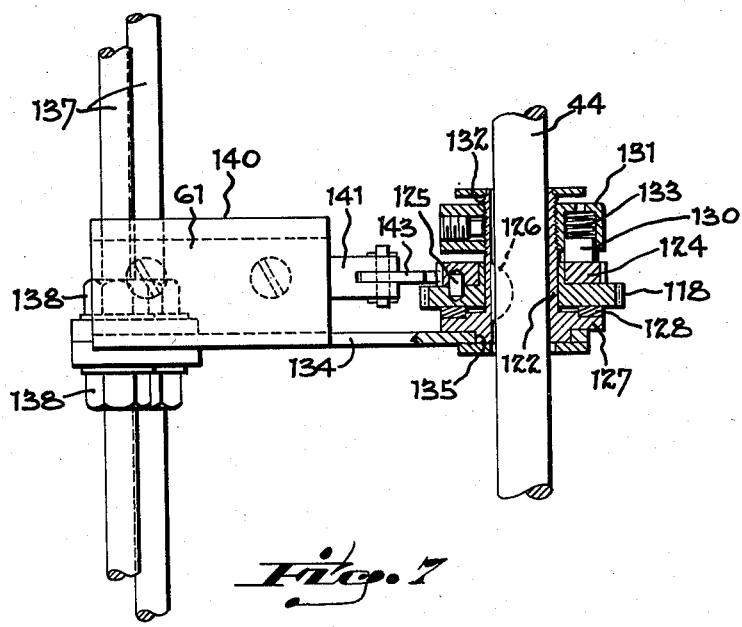

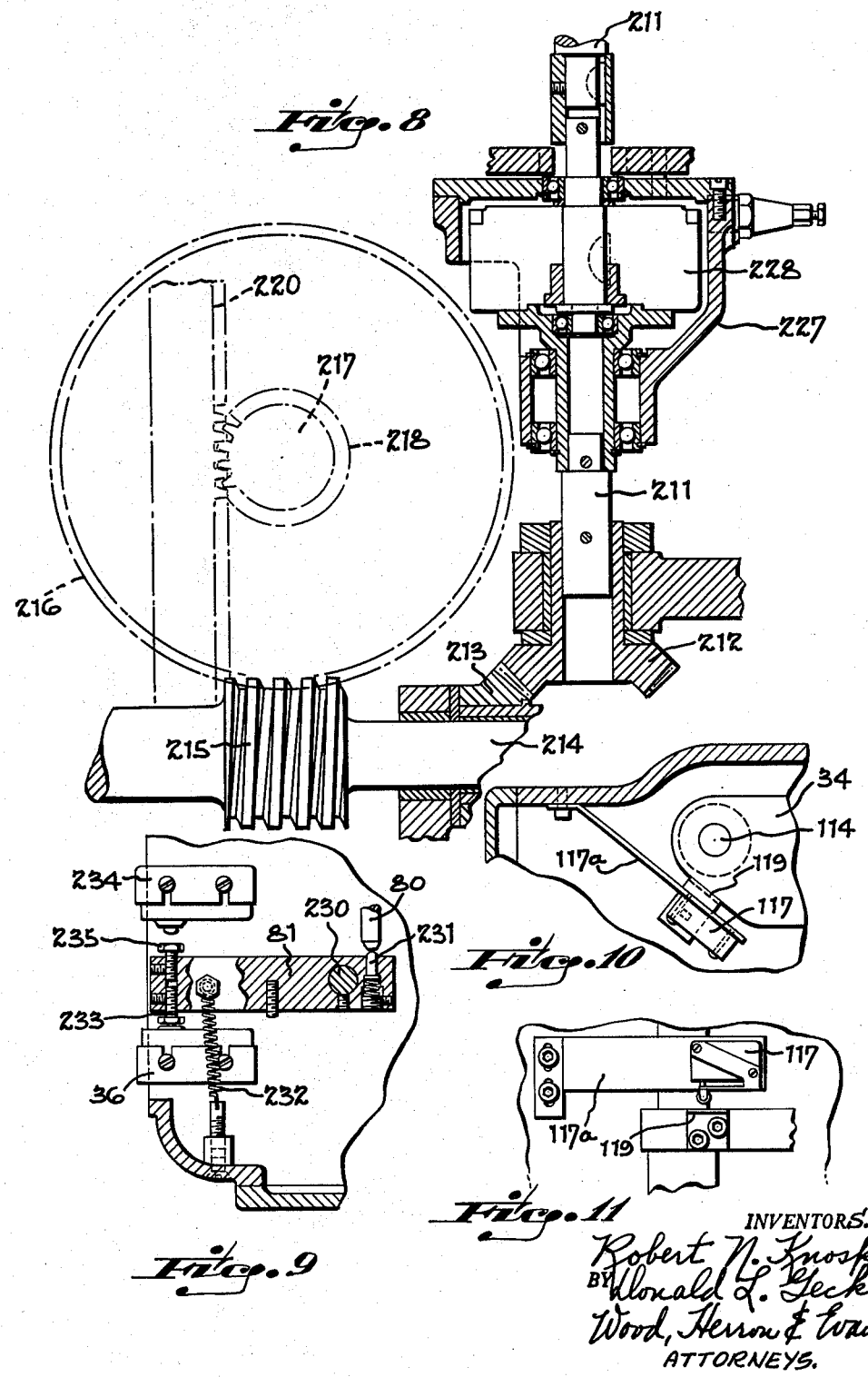

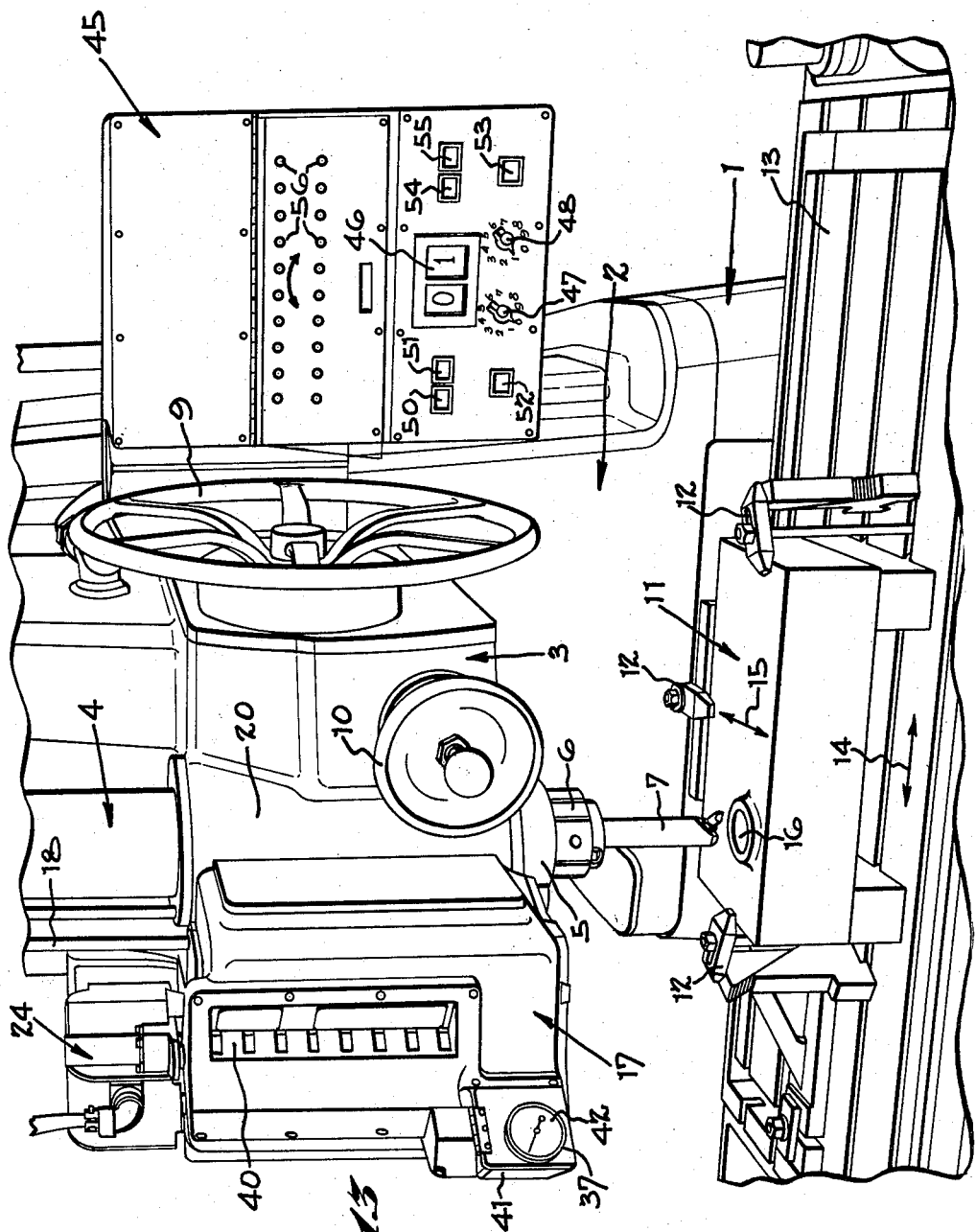

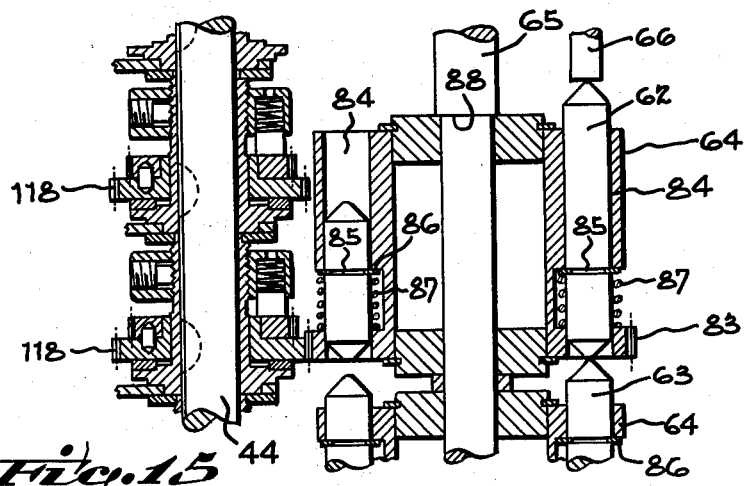
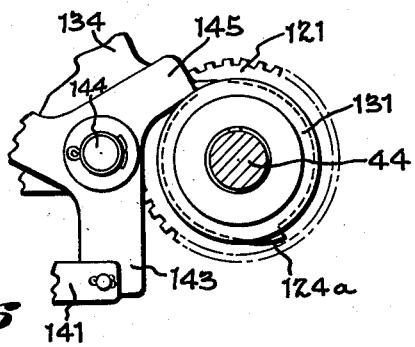
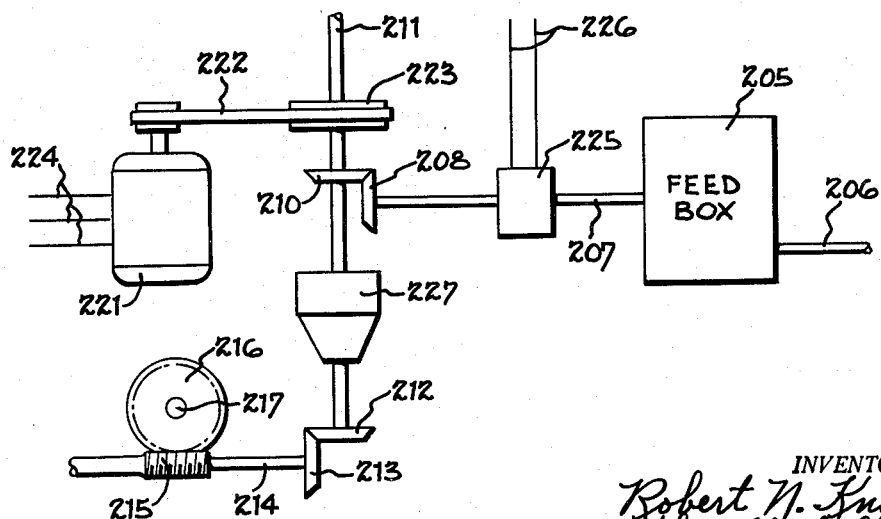

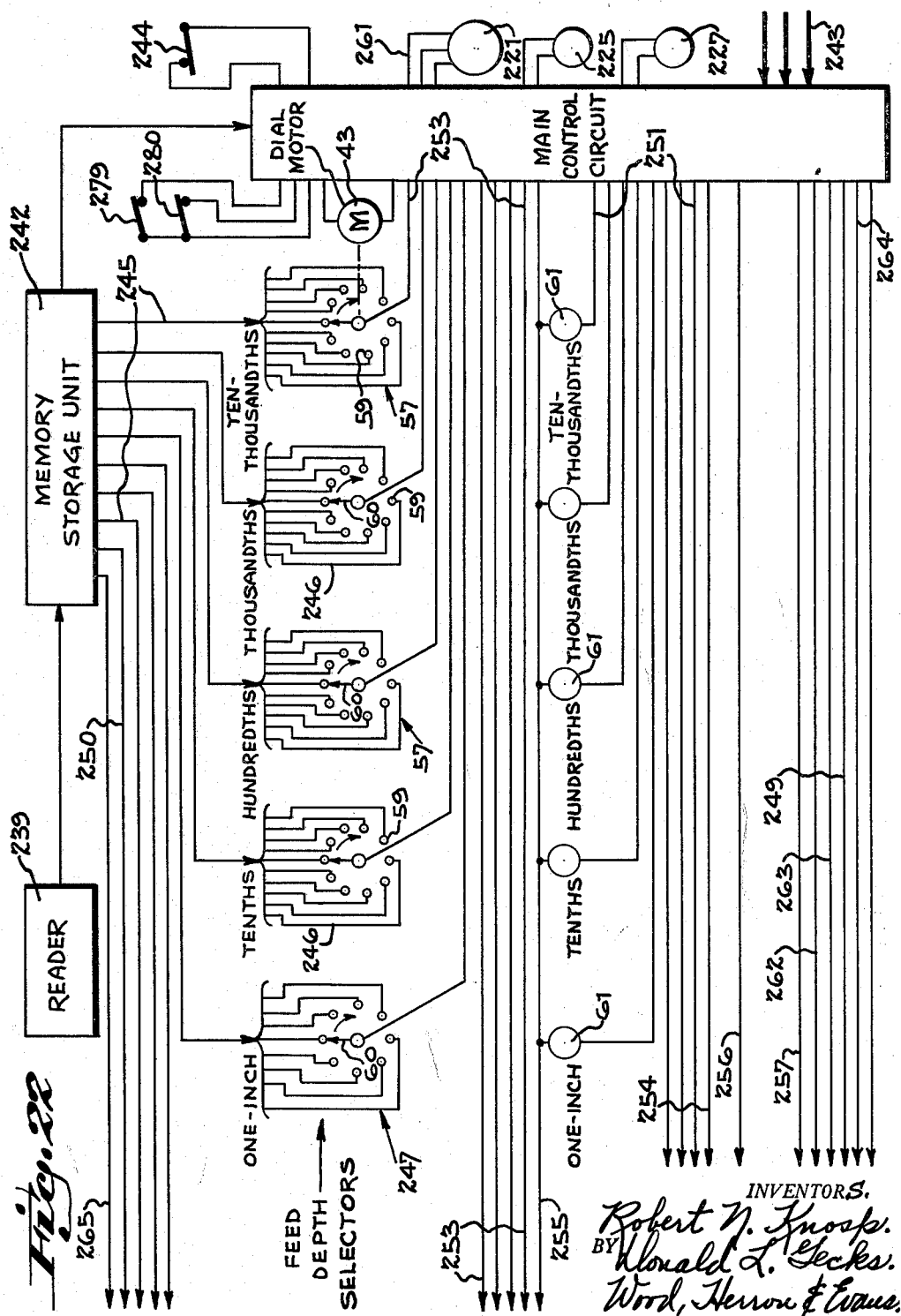

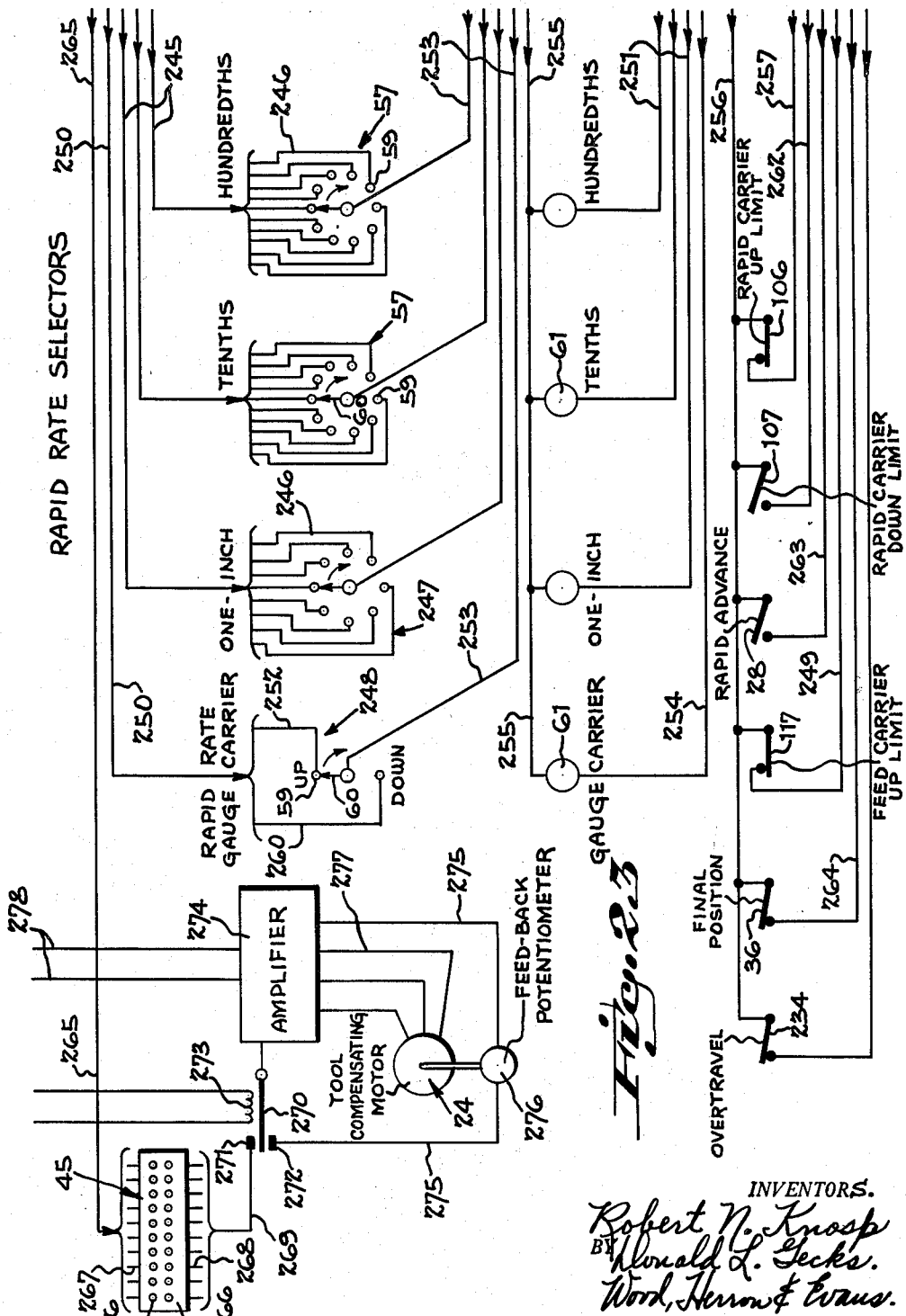

3,100,406
AUTOMATIC CONTROL APPARATUS FOR SPINDLES

Robert N. Knosp, Ludlow, Ky., and Donald L. Gecks, Cincinnati, Ohio, assignors to The Fosdick Machine Tool Company, Cincinnati, Ohio, a corporation of Ohio
Filed Aug. 22, 1960, Ser. No. 51,023
14 Claims. (Cl. 77—4)

This invention relates generally to machine tools of the type having an axially movable tool spindle or the like, and is directed specifically to an apparatus for controlling the axial spindle motion in an automatic manner.

The present apparatus is disclosed in relation to the quill and spindle of a jig boring machine, which is used in machining operations involving the precise location and machining of holes in a workpiece. A typical jig boring machine of this character comprises a stationary bed having a saddle or cross slide which is shiftable along one coordinate or path of motion with respect to the bed, the saddle having a work table which is slidable upon the saddle along a second coordinate at right angles to the first coordinate. The tool spindle is mounted on a column rising from the bed and is adapted to advance the cutting tool axially with respect to a workpiece which is clamped to the table, the hole center being aligned with the tool axis by the combined movements of the saddle and table.

In order to position the workpiece with a high degree of precision with respect to the tool axis, a gauging and positioning apparatus, as disclosed in Patent No. 2,932,-088, issued to Robert N. Knosp, one of the present applicants, is used to regulate the position of the saddle and table. As disclosed in the patent, the positioning mechanism of the table and saddle may be regulated by a numerical control or programing system in response to information which is first sensed or read from a tape or the like and transformed into electrical signals. These signals in turn, cause operation of motor controls which shift the slide and table to a retracted position, cause sets of gauging rods to be shifted to an active position, and finally cause the table and slide to be shifted along their coordinates until respective table and slide abutments engage the stacked gauge rods, thereby to locate the table and saddle each at a final position with the hole center precisely aligned with the tool axis.

A numerical control system which provides complete automatic regulation of the functions of a jig boring or other machine tool, is disclosed in the copending application of Robert N. Knosp et al., Serial No. 786,589, filed January 13, 1959. This apparatus operating under tape control or the like, regulates the gauging apparatus and the table and slide motion noted above; it also provides automatic selection of spindle speed rates, spindle feed rates, and automatic tool selection for performing different types of machining operations on a given workpiece.

One of the important advantages of the programing system of this character arises in the speed at which the sequence of machine functions is carried out. However, during any automatic machining operation of this character, a great deal of time is lost if the spindle must advance and retract with respect to the top surface of the work at the relatively slow feed rate which is used during the actual cutting operation.

One of the primary objectives of the present invention has been to provide an automatic control apparatus which provides a two-stage spindle cycle, the first stage causing rapid advancement of the spindle from a retracted position, so as to bring the working end of the tool rapidly to a plane closely adjacent the top surface of the work, the second stage causing advancement of the tool at a slower, preselected feed rate to a predetermined depth, thereby to save a great deal of time which would otherwith be consumed during the spindle cycle of operation.

According to this aspect of the invention, axial spindle motion is regulated by a two-stage depth gauging apparatus, the first stage measuring the distance of spindle travel at the rapid advancement rate and the second stage measuring the spindle travel at the relatively slow feed rate. In a given machining operation, the spindle resides in a retracted position at the start of the spindle cycle, and the degree of rapid advancement is determined by the elevation of the top surface of the workpiece, the length of the cutting tool which is mounted in the spindle, and other variable factors. By reason of these variables, the rapid advancement gauging apparatus is arranged to be reset for different operations, such that the tool may be brought rapidly within a small fraction of an inch above the surface of the workpiece at the start of each spindle cycle. In a similar manner, the feed depth gauging apparatus is arranged to be reset in order to provide for the thickness of the workpiece, or to determine the depth of the hole to be machined.

A further objective of the invention has been to provide a depth gauging apparatus which is adapted to be reset for each spindle cycle by a numerical control system, whereby the degree of spindle travel at the rapid advancement rate and at the feed rate is brought about rapidly in an automatic manner in response to electrical signals which represent the gauging digits.

Described generally, the gauging apparatus of this invention includes respective sets of stacked gauge rods, one set providing the rapid advancement gauging and the second set providing the feed depth gauging. The rapid advancement and feed depth gauge rods are also referred to as "shiftable gauging elements" in the claims of this application. In the present example, the rapid advancement gauging apparatus (first stage) consists of two sets of decimal gauge rods (shiftable gauging elements) graduated in increments of tenths and hundredths of an inch, and coacting with a rotatable unit gauge or carrier having gauging surfaces graduated in increments of one inch. Thus, the rapid advancement gauges may be set to provide spindle advancement expressed as three digits, for example 5.85". The feed gauging apparatus (second stage) is provided with four sets of stacked decimal gauge rods (shiftable gauging elements) graduated in lengths of tenths, hundredths, thousandths, and ten-thousandths of an inch. These stacked gauges also coact with a rotary unit gauge which provides gauging surface increments of one inch, the combined gauges providing an additive meausrement expressed as five digits, for example, 1.7682".

The rotary unit gauges for the rapid advancement (first stage) and feed rates (second stage) are mounted parallel with one another and the related sets of decimal gauge rods are carried in rotatable turrets so arranged that the decimal rods selected reside in endwise alignment along a common axis which is also common to respective stop elements of the carriers. During the indexing or gauging cycle, both rotary one-inch gauge carriers are elevated to permit the turrets and their decimal gauge rods to be rotated to individual positions corresponding to the digits signalled by the numerical control system, while the spindle resides in its retracted position. Thereafter, the first stage carrier is lowered to bring its stop into engagement with the stacked decimal gauge rods (with the spindle retracted). The second stage carrier is spring biased and remains elevated until a depth control rod, which moves with the spindle, shifts it downwardly, as explained below.

During the spindle cycle, the depth control rod, which is connected to the quill, moves downwardly with the quill and spindle relative to the selected gauge surfaces of the two one-inch carriers; the control rod includes a limit switch adapted to be tripped by the selected first stage one-inch gauge carrier and the lower end of the rod is adapted to abut the selected second stage carrier gauge.

During the quill and spindle movement from the retracted position, the axial motion is imparted to the quill and spindle by a rapid traverse motor; when the rapid traverse limit switch of the control rod engages the first stage carrier gauge, this motor is deenergized and the spindle feed continues at the slower feed rate (second stage) through operation of the feed transmission.

At some point during the second stage, as determined by the feed depth setting, the end of the control rod engages the selected one-inch gauge of the second stage carrier and shifts the carrier downwardly counter to its spring. The feed gauge apparatus includes a final limit switch which is tripped at the second stage or depth limit. This switch decommissions a magnetic clutch so as to arrest the feeding motion precisely at the preset feed depth. Thereafter, the rapid advance motor is energized in the reverse direction, so as to shift the spindle and tool at the rapid rate back to the retracted position, thus ending the cycle for a given hole. The numeral control apparatus thereafter repositions the table and saddle to locate the next hole with respect to the spindle axis, then the spindle cycle is repeated.

During a sequence of automatic operations upon a workpiece, the numeral control system will signal for a tool change at the start of a spindle cycle, when the next hole so requires. In response to the signal, the machine automatically disengages the tool presently chucked in the spindle and replaces it with the new tool, the tools being arranged in a predetermined numbered sequence. It will be understood that the various tools have standard lengths which may vary considerably from one tool to the next.

It has been a further objective of the invention to provide a tool compensating mechanism so arranged that the mechanism readjusts automatically for any difference in the length of the tool when a tool change is signalled, whereby the spindle is advanced at the rapid rate until the end of the tool is in close proximity of the work surface without regard to the length of the tool.

It will be understood that the control tape is prepared in accordance with the engineering drawings and other data, so as to provide the machine functions in the required sequence. In preparing the tape for tool compensation, the length of the tool is taken into account but the actual length of the tool may vary by as much as an inch, such that the compensating digits signalled to the apparatus would not bring the working end of the tool closely adjacent the work surface at the rapid advancement rate. However, the tool compensating mechanism is adapted to be set on the machine in accordance with actual length of the tool so that during subsequent operation under tape control, tool length differences are compensated for each tool in an automatic manner, prior to the downward spindle travel under rapid advancement.

In general, the tool compensating mechanism comprises a reversible tool compensating motor which is arranged to raise or lower the control rod relative to the rapid advance and feed gauging apparatus. In the present example, the apparatus includes an electrical circuit interconnected with the compensating motor and including a series of adjustable potentiometers, one for each tool of the series, the motor being in driving connection with a feed-back potentiometer. The feed-back and adjustable potentiometers are interconnected in a suitable control circuit to create a servo-motor action, whereby the motor operates in a direction tending to balance the values of the two potentiometers, thus shifting the control rod in the appropriate direction. After the tape is prepared, each tool potentiometer is set manually at the machine so as to compensate for the difference in actual tool length and the length numerically coded on the tape. During automatic operation the compensating motor is energized automatically in the proper direction to raise or lower the control rod according to the value provided by the potentiometer for that particular tool.

The various features and advantages of the invention will be more clearly apparent to those skilled in the art from the following detailed description taken in conjunction with the drawings.

In the drawings:

FIGURE 1 is a fragmentary plan view of the head of a jig boring machine incorporating the spindle control mechanism of the present invention.

FIGURE 2 is a fragmentary sectional view illustrating a development of the dial drive and gauge carriers of the depth control apparatus, taken generally along line 2—2 of FIGURE 1.

FIGURE 3 is a fragmentary sectional view forming a continuation of FIGURE 2 and showing the remaining development of the control apparatus.

FIGURE 4 is a fragmentary sectional view of the upper portion of the quill broken away from FIGURE 2 and showing the tool compensating motor drive.

FIGURE 5 is a diagrammatic perspective view, further illustrating the depth control mechanism shown in FIGURES 2 and 3. In this view, a portion of the dial drive mechanism has been displaced transversely from its true position, as indicated by the broken lines, in order to more clearly illustrate the structure.

FIGURE 6 is a sectional view taken along line 6—6 of FIGURE 2, detailing the solenoid mechanism which locks the dial in a selected position during automatic tool depth selection.

FIGURE 7 is a view partially in section taken along line 7—7 of FIGURE 6, further illustrating the solenoid mechanism.

FIGURE 8 is a fragmentary sectional view showing the electrically operated auxiliary feed clutch which imparts rapid traverse motion to the quill during its advancement and retracting motions.

FIGURE 9 is a fragmentary sectional view of the final limit switch and tripping mechanism which stops the quill feed at its downward limit of travel.

FIGURE 10 is a fragmentary sectional view showing the safety switch which prevents energization of the dial motor until the gauge carrier is in its elevated position, thereby to permit rotation of the gauge carriers.

FIGURE 11 is a fragmentary view of the safety switch as projected from FIGURE 10.

FIGURE 12 is a fragmentary view showing the dial indicator which is tripped at the lower limit of quill feeding motion.

FIGURE 13 is a fragmentary perspective view of a jig boring machine which is provided with the spindle depth control mechanism of the present invention.

FIGURE 14 is a section as viewed along line 14—14 of FIGURE 3, illustrating the crank mechanism and limit switch which controls the raising and lowering of the rapid advance gauge carrier.

FIGURE 15 is an enlarged fragmentary sectional view, taken from FIGURE 2, detailing one of the decimal gauge turrets.

FIGURE 16 is a diagrammatic view showing the ratchet wheel which regulates the vertical motion of the rapid advancement gauge carrier.

FIGURES 17–20 are diagrammatic views illustrating the spindle motion during the tool length compensating cycle.

FIGURE 21 is a diagrammatic view illustrating the driving system for shifting the spindle at the rapid advancement and feed rates.

FIGURES 22 and 23 illustrate a simplified electrical control circuit suitable for regulating the depth gauging apparatus.

General Arrangement and Operation

As noted above, the depth control apparatus of this invention utilizes the stacked measuring rod principle, generally similar to that shown in the prior Knosp et al. Patent No. 2,932,088. According to the prior patent, respective sets of measuring rods or gauges are mounted in rotatable dials which are rotated to shift selected rods into alignment with one another to provide a given lineal dimension which precisely locates the table and cross slide from a given back-off position to a new position in relation to the axis of the tool spindle. The present apparatus includes stacked sets of gauges or measuring rods adapted to control the feeding movement of the quill from a given retracted position to a final depth which is determined by the additive length of the selected measuring rods.

Described generally with reference to FIGURE 13, the jig boring machine embodying the present depth control mechanism comprises a bed 1, having an upright column 2 rising from its rearward side. A drill head 3 is slidably mounted upon vertical ways (not shown) which are formed on the column, adapting the head to be adjusted vertically with respect to the column. A vertically slidable quill 4 passes through the head 3 and journals a rotatable spindle 5 (FIGURE 17), the lower end of the spindle having a chuck 6 which mounts the cutting tool 7. The spindle 5 is rotated at a selected cutting speed by means of a speed change transmission, as explained later, which is mounted upon the column above the head 3, the spindle being in driving connection with the transmission by means of a splined shaft 8 (FIGURE 5). During a machining operation, the spindle rotates relative to the quill while axial feeding motion is imparted to the quill in response to the depth control mechanism of this invention, as explained later in detail. The head 3 includes a hand wheel 9 (FIGURE 13) which permits the quill to be adjusted vertically and is also provided with a small fine feed hand wheel 10. However, neither of these hand wheels is utilized when the machine is under control of the automatic depth control mechanism of this invention.

The workpiece, which is indicated generally at 11 (FIGURE 13) is clamped as at 12 upon a table 13 of conventional construction. The table is mounted for longitudinal motion, as indicated by the arrow 14, upon a cross slide or saddle (not shown) which is slidably mounted upon the bed of the machine. The cross slide in turn is movable along the bed in a transverse direction, as indicated by the arrow 15. Thus, prior to a machining operation, the workpiece is positioned with respect to the axis of the tool by the combined positioning movements of the cross slide and table along the two coordinates 14 and 15. In the present example during one of the operations under automatic control, the hole 16 of the workpiece is brought into alignment with the tool 7 which is arranged to perform a boring operation with respect to the hole to a depth regulated by the depth control mechanism.

During automatic operation, the position of the work is determined precisely by the positioning apparatus respectively of the cross slide and table as disclosed in the aforesaid Knosp Patent No. 2,932,088, which in turn, may be regulated by the numerical control system disclosed in the copending application of Robert N. Knosp and Donald L. Gecks, Serial No. 786,589, filed January 13, 1959. The present depth control apparatus is arranged to operate manually during initial tool set up and is intended for automatic operation thereafter in conjunction with the above numerical control system as one of the several machine functions which are performed in predetermined order under control of a coded tape or the like. In other words, after the positioning cycle is completed, with the workpiece located in working position with respect to the tool axis, and after other automatic machine functions, such as tool selection, have been completed, then the numerical control system signals the spindle control apparatus to initiate the machining cycle. After the cycle is thus initiated, the spindle control apparatus performs a sequence of operations in predetermined order, as explained below, and thereafter sends a signal to the numerical control system, such that a succeeding machine function is initiated after the spindle has completed its operation and has retracted to its starting position.

Upon initiation of the machining cycle, the spindle control apparatus advances the cutting tool at a rapid rate (first stage) during its non-cutting movement and at a slower feed rate (second stage) during its cutting motion, so as to reduce the overall time for a given machining operation. Thus, when the depth control apparatus is regulated automatically by the numerical control system, the saddle and table, during a given cycle, are shifted along their two coordinates to locate the hole center, while the spindle and tool reside in the retracted position. Thereafter, when the numerical control system signals to initiate the machining cycle, the quill 15 is shifted downwardly at the rapid rate to a predetermined plane above the work surface (FIGURE 18). At this point, the rapid advance mechanism is decommissioned and the feed mechanism becomes effective to continue advancing the tool in the same direction, but at a slower feed rate during the machining operation (FIGURE 19). At the depth limit (FIGURE 20), the slow feed mechanism is decommissioned and the tool is withdrawn from the work back to its retracted position at the rapid rate. The spindle control apparatus then signals the numerical control system as noted above, in order to cause initiation of the next machine function.

The dial drive mechanism, gauge carriers, and other components of the spindle control apparatus are mounted within a dial housing, which is indicated generally at 17 in FIGURES 1 and 13. The dial housing is attached directly to the front of the drill head 3, adjacent the quill 4, there being provided a depth control rod, indicated at 18, which is connected to the quill so as to move axially with the quill relative to the spindle control mechanism, as explained later in detail. As viewed in FIGURE 1, the drill head includes a bearing sleeve 20 in which the quill 4 (not shown in this view) is slidably journalled, the sleeve having a T-slot 21 (FIGURE 1) receiving a series of nuts 22 for attachment of the housing 17. The opposite side of the housing 17 is attached to the drill head by a series of bolts 23. The quill 4 thus moves vertically with respect to the spindle control apparatus within the housing 17, the movements of the quill being transmitted to the control apparatus through the rod 18, which is attached to the quill, as explained later.

In addition to the rapid advance and feed rates explained above, the present apparatus is also arranged to compensate for the length of the tool which is mounted in the spindle chuck. For this purpose, the depth control rod 18 may be shifted axially with respect to the quill by operation of a tool length compensating motor 24 (FIGURE 4) which is in driving connection with a threaded upper portion 25 of the depth control rod 18. The motor 24 is energized in forward or reverse directions, as explained later, so as to shift the depth control rod 18 axially in accordance with variations in the length of the different tools which are used in sequence. The depth control rod 18 in turn coacts first with the rapid traverse or advance control mechanism so as to advance the tool rapidly from the retracted position toward the work, and also coacts with the feed control gauges to determine the final depth to which the cutting tool is fed. As noted earlier, the distance of tool travel from the retracted position under rapid advancement is governed by a set of first stage gauges, while the tool travel at the slower feed rate is governed by a set of second stage gauges.

Referring now to FIGURE 5, the rapid advance gauging apparatus (first stage), which is indicated generally at 26, is provided with a set of three dials and associated decimal and one-inch gauges or shiftable gauging elements, indicated generally at 27, which provide a measurement setting of three digits, for example 5.85", representing tool travel from the fully retracted position under rapid advance. The lower portion of the depth control rod 18 includes a microswitch indicated at 28 (FIGURES 3 and 5) which is tripped by the rapid advance mechanism at the limit of rapid tool advancement so as to cut in the slower feed rate as the tool approaches the work. For this purpose, the rapid advance mechanism includes a rotary unit (one-inch) gauge carrier, indicated generally at 30, which includes spirally arranged one-inch gauge surfaces or abutments 31 engaged by the microswitch 28 in accordance with the selected rapid advance dimension. These abutments provide one-inch units of measurement, while the decimal units are provided by gauge rod turrets, as explained later.

The depth control rod 18 also coacts with the feed gauging mechanism (second stage) which is indicated generally at 32 in FIGURES 2 and 5. The feed gauging mechanism 32 includes a set of five dials indicated generally at 33 and associated gauges or shiftable gauging elements, which provide a measuring or gauge setting of five digits, for example 1.7682". The setting of the feed gauge mechanism determines the distance of tool travel at the slower feed rate after the switch 28 has been tripped at the limit of rapid spindle motion by the rapid advance gauging apparatus 26. For this purpose, the feed gauging apparatus also is provided with a rotary one-inch gauge carrier, indicated generally at 34, which is similar to the carrier 30 and which is mounted parallel therewith. In this case, the carrier is spring biased upwardly and the lower end of the control rod 18 provides direct engagement with a selected gauge surface or abutment 35 of the carrier 34. Upon engaging the selected gauge surface 35, the control rod shifts the carrier 34 downwardly counter to its spring and this motion trips a final limit switch 36 (FIGURE 5). Upon being tripped, switch 36 decommissions the feed drive and initiates the rapid advance or traverse drive in the opposite direction, so as to retract the tool from the hole. When the switch 36 is tripped, a dial indicator 37 (FIGURES 5 and 13) is also tripped so as to indicate to the operator that the machining operation is completed. It will be noted that the abutments 35 are also spirally arranged similar to the rapid advance gauging apparatus, in order that they may be selectively placed in the axial path of motion of the rod 18 in accordance with the selected depth dimension. The one-inch gauge carrier 34 also coacts with decimal gauge rod turrets, as described later.

It should be noted that the two sets of dials 27 and 33 have been displaced in FIGURE 5 for purposes of illustration; the dials actually are mounted upon a common shaft 38, as indicated by the broken line A in FIGURE 5. Thus, the eight dials are disposed one above the other and are visible in the window 40 (FIGURE 13) of the housing 17.

The dial indicator 37 is mounted in an offset 41 in the lower portion of the housing 17 (FIGURE 13), the offset having a hinged cover 42 which includes a window exposing the indicator face. The dials are rotated to their selected positions for rapid advance and feed travel by a dial motor 43 (FIGURES 2 and 5), which drives respective gear trains for rotating the individual gauges or measuring rods to their selected positions, as explained later. The motor includes an elongated shaft 44 which has been displaced for convenience of illustration, the connection of the two shafts being indicated by the broken line B in FIGURE 5.

The numerical control system forms no part of the invention and the details have been omitted from this disclosure. That portion of the system which regulates the depth control apparatus includes a control panel indicated generally at 45 in FIGURE 13, which permits manual regulation of the spindle functions independently of the numerical control system. These manual controls are intended primarily for use in initially setting up the machine for the sequence of operations necessary in machining a given workpiece.

It will be understood that in machining the workpiece, a number of different cutting tools are used for the series of operations. Under numerical control, the tools are placed sequentially in the spindle chuck in an automatic manner for each operation, the arrangement being such that the window 46 (FIGURE 13) of the control panel indicates the number of the tool which is mounted in the chuck during each operation. The control panel further includes two rotary selector switches, indicated at 47 and 48, which may be manually operated to select a tool independently of the numerical control system when the machine is being set up. It will be noted that the selector switches provide for the selection of twenty different tools.

Other manual operations are carried out by a plurality of push buttons. Thus push button 50 (FIGURE 13) provides selective manual or automatic operation of the spindle control apparatus. The adjacent push button 51 permits manual selection of spindle depth control, that is, the distance the spindle travels at rapid advancement and at the feed rate. In manual operation, the sets of dials 27 and 33 (FIGURE 5) are rotated to positions for setting the decimal and one-inch gauges for selected rapid advance and feed motion of the spindle. The actual positions of the several dials are selected by operation of rotary selector switches having positions from zero to nine, corresponding to the digits of the dials. These selector switches (not shown) are mounted upon the main control panel of the numerical control system and cause the gauge dials to be rotated by power to the selected positions.

When operating under numerical control, the different tools are selected in an automatic manner in response to command impulses derived from the coded tape. In the present example, the apparatus is arranged to select from a total of twenty tools. During initial set-up operations, these tool change cycles are initiated manually by depressing the tool change push button switch 52 (FIGURE 13). The spindle cycle may be initiated manually by depressing the push button 53. In manually setting up the machine, the compensating motor 24 may be energized in forward or reverse directions by the compensating buttons 54 and 55, thereby to raise or lower the spindle with respect to the setting of the rapid advance gauging apparatus 27.

In setting up for numerical control, the coded numerical tape is prepared on suitable equipment by a technician, who works directly from the engineering drawings to translate the operation sequences, tool changes, tool rapid advance travel, feed travel, and feed rate into perforations or the like in the tape. In selecting the rapid travel distance, the length of the tool must be known within one-half inch. By way of example, if the length of the tool is approximately ten inches in its working end, in the retracted position, resides five inches above the surface of the work, the tape should be punched to provide approximately five inches rapid traverse spindle motion. Thus, if the actual length of the tool is nine and one-half inches, that is one-half inch shorter, then the apparatus would stop the rapid advance motion when the working end of the tool is one-half inch above the surface of the work.

In order to compensate for this difference in tool length, the compensating apparatus (motor 24) is adjusted on the machine as one of the set-up operations. Referring to FIGURES 17 and 18, which show the spindle in its retracted position, the punched tape is coded to advance the spindle and working end of the tool rapidly to the position indicated at C, which may represent one-half inch, as explained above. Since the spindle is fed at the slow feed rate after the rapid advancement, a great deal of time would be lost if compensation is not made for the clearance C. Therefore, the compensating motor is energized by hand (push buttons 54 and 55) in the direction to raise the depth control rod 18, as shown in FIGURE 19 causing the spindle and tool to shift downwardly and bringing the end of the tool to a plane which is a small fraction of an inch above the surface of the work, as indicated at D. The slow feed rate is commissioned at this point, causing the tool to machine the work until the depth control rod 18 trips the selected abutment 35 in the final limit (FIGURE 20) causing the tool to be retracted rapidly.

When initially setting up the machine for a number of tool changes, the apparatus is adjusted at the machine to compensate in this manner for the length of each tool which is called for by the punched tape, so that under numerical control, the compensating cycle is carried out automatically at the beginning of each spindle cycle. According to the present example, the control system for the compensating motor 24 is provided with a set of twenty adjustable potentiometers, and the motor is in driving connection with a feed-back potentiometer, the circuit being such that a servo-motor action is brought about, causing the depth control rod 18 to be raised or lowered in accordance with the setting of the adjustable potentiometers.

As viewed in FIGURE 13, each potentiometer, which represents an individual tool, is provided with an adjustment head 56, adapting the potentiometer to be adjusted with a suitable instrument. Thus, after a given tool is mounted in the chuck during a set-up operation the spindle is fed downwardly at the rapid advance rate (FIGURE 18), the operator rotates the adjustment head 56 in the appropriate direction to raise or lower the spindle (FIGURE 19). After this compensating adjustment has been made for each tool, the compensating action is carried out automatically upon each tool change during operation under numerical control. Thus, no further adjustment need be made unless it becomes necessary to sharpen one or more of the tools, causing a change in length.

*Rapid Advance and Feed Depth Gauging Apparatus*

As pointed out above, both the rapid advance gauging apparatus 26 (first stage) and the feed gauging apparatus 32 (second stage) are indexed to gauging position by the dial motor 43 driving through suitable gear trains. The position to which the individual dials 27 and 33 are rotated is determined by individual selector switches indicated generally at 57 (FIGURES 2, 5, 22 and 23). In general, each switch comprises a stationary slip ring 58 (FIGURE 5) and a commutator having a series of ten stationary contacts 59 concentric with the slip ring 58. The ring and contacts are mounted upon respective adjustment plates 134 (FIGURES 2 and 6 as described later) the individual contacts and rings being insulated from one another. The structural details of the selector switches are shown in the aforesaid Knosp Patent No. 2,932,088 and they are also shown diagrammatically in the electrical circuit of FIGURES 22 and 23.

The ten contacts 59 correspond to the digits zero to nine of the individual decimal dials. In addition, there is provided two selector switches for indexing the one-inch gauge carriers 30 and 34 which are provided by eight contacts, representing the digits zero to seven and corresponding to the eight gauging positions of the carriers. There is also provided one selector switch having two contacts for controlling the vertical movement of the rapid advance one-inch gauge carrier 30.

Each selector switch further includes a brush 60 (FIGURES 2 and 5) which establishes a bridging circuit between the ring and contacts so as to complete an electrical circuit which causes the gauges to be stopped at their preselected positions. In general, during dial selection one contact 59 of each selector switch is energized by the programing apparatus, the arrangement being such that when the circuit is completed between the energized contact and slip ring by the brush 60, a circuit is completed to an associated solenoid 61 (FIGURES 6 and 7), which stops the dials at the selected position, as explained later with reference to the electrical circuit. The construction and operation of the dial drive mechanism is described in detail later.

As explained earlier with reference to FIGURE 5, the rapid traverse gauging apparatus (first stage) comprises two sets of decimal gauge rods (shiftable gauging elements) and a one-inch abutment carrier previously indicated at 30, upon which the gauging surfaces or abutments 31 are spirally arranged. The abutments are serially located in alignment with the microswitch by rotary stepwise adjustment of the carrier 30. The first abutment 31 (gauge surface) at the top represents zero, the remaining abutments increasing in steps of one inch, such that the lowermost abutment provides a measurement of seven inches. The first set of stacked decimal gauges or rods (shiftable gauging elements), indicated at 62 is arranged in a series of ten, the shortest rod representing zero, the remaining rods increasing in steps of one-tenth, such that the longest rod provides a measurement of nine-tenths of an inch (FIGURES 3 and 5). The second set of stacked decimal gauge rods (shiftable gauging elements) indicated at 63, is also arranged in a series of ten, the shortest rod representing zero, the remaining rods increasing in steps of one-hundredth of an inch each, the longest rod representing nine-hundreths of an inch. In the present example, the rapid advance gauging apparatus (first stage) provides a maximum measurement of 7.99".

The two sets of decimal gauge rods are carried in rotatable turrets indicated at 64—64 (FIGURES 2, 3, 5 and 15) which are rotatably journalled upon a turret shaft 65. The turrets are thus mounted upon a common axis of rotation and the individual gauging rods (shiftable gauging elements) reside in a circle which passes through an axis common to the two rapid advance abutment studs 66 and 67. The upper abutment stud 66 is carried by the one-inch gauge carrier 30 and the lower abutment stud 67 is mounted in a flange 68 formed in the housing 17, the two studs being mounted upon a common axis.

In order to permit the first stage stacked decimal gauges 62 and 63 (shiftable gauging elements) to be indexed to a selected measurement, the one-inch gauge carrier 30 is shifted at the beginning of a cycle to an elevated position, as shown in FIGURES 3 and 5 so as to provide a maximum spacing between the abutment rods 66 and 67. This spacing is slightly greater than the maximum measurement 7.99", the dimension being such that a slight amount of clearance exists between the ends of the stacked gauge rods when they are shifted to the maximum measurement.

During the measuring cycle, the rapid traverse one-inch gauge carrier 30 is first shifted to the elevated position shown in FIGURES 3 and 5, then the dials, gauge rods, and one-inch gauge carrier are rotated to provide a dimension as signalled by the numerical control system; thereafter, the carrier is shifted downwardly to bring the abutment studs 66 and 67 into endwise abutment with stacked rods (shiftable gauging elements). The selected one-inch abutment 31 is thus positioned relative to the limit switch 23 to a plane which is determined by the decimal gauges. The driving system for the turrets and gauge carrier is described in detail later.

The stacked gauges of the feed gauge mechanism (second stage) previously indicated at 32 comprise decimal gauge rods or shiftable gauging elements arranged in four individual sets in the order of tenths, hundredths, thousandths, and ten-thousandths of an inch. These stacked decimal gauge rods (shiftable gauging elements) coact with the one-inch abutments (gauging surfaces) 35 of the carrier 34. In the present example, the one-inch abutments and the decimal rods are arranged to provide a maximum dimension of 7.999". The tenth rods, indicated at 69 (FIGURES 2 and 5) are arranged in a series of ten, the shortest rod representing zero and the length of the rods increasing in tenths of an inch, the longest rod, which is shown indexed to its measuring position, representing nine-tenths of an inch. The remaining sets of rods 70, 71 and 72 are similarly arranged respectively in increments of one-hundredths, one-thousandth and one ten-thousandth of an inch. These gauges similar to the rapid traverse gauges, are mounted in turrets indicated at 73, 74, 75 and 76 which are loosely journalled upon a second turret shaft, indicated at 77. The turret shafts 65 and 77 are shown in FIGURES 2 and 3 and the relationship of the two shafts is best shown in FIGURE 1.

The feed depth dimension (second stage) is selected, similar to the rapid advance dimension (first stage), by rotating the turrets individually to bring the selected gauge rods (shiftable gauging elements) in stacked relationship in alignment with a pair of abutment studs 78 and 80, the upper stud 78 being mounted upon the gauge carrier 34 and the lower abutment stud or feeler 80 (FIGURES 2, 5 and 9) being mounted in a lever 81 which operates the limit switch 36, at the lower limit of tool travel.

The one-inch feed gauge carrier 34 (second stage) is normally biased to an elevated position by means of a spring 82 (FIGURE 2) so as to provide spacing between the abutments 78 and 80 which is slightly greater than the length of the maximum measurement (7.999") to permit rotation of the turrets and rotary abutments (gauging surfaces) 35 to selected positions. The gauge carrier remains in the elevated position until the end of the depth control rod 18 engages the selected one-inch abutment and shifts the carrier downwardly toward final spindle position.

It will be recalled at this point, that the tool is advanced in the rapid rate until the rapid traverse switch 28 is tripped by the rapid traverse abutment (gauging surface) 31; it will also be recalled that the spindle continues at the slower feed rate until the lower end of the depth control rod 18 engages the selected abutment (gauging surface) 35 of carrier 34. As the carrier 34 approaches final position through operation of rod 18, the upper abutment stud 78 forces the stacked decimal gauges downwardly, thus depressing the lower feeler rod or abutment stud 80, thereby actuating the lever 81 and tripping the limit switch 36.

As noted earlier, FIGURES 2 and 3 together represent a development of the gear trains which drive the turrets and indicating dials of the depth control apparatus, the true relationship of the shafts being shown in FIGURE 1. Since the rapid advance and feed turrets are similar, they are described in detail with reference to FIGURE 15. The rapid traverse (first stage) turrets 64 and 65 each include a gear turret 83 keyed thereto for rotating the turrets to measuring position. The sets of gauge rods (shiftable gauging elements) are slidably mounted in respective bores 84 passing through the turrets and gears 83. Each rod is grooved as at 85 and has a split ring 86 seated in the groove. A compression spring 87 has its lower end seated upon the gear 83 and its upper end engaged against the split ring. The springs thus hold the gauge rods in elevated position and adapts them to be shifted downwardly into engagement with the lower abutment stud when the measurement is made. The turret shaft 65 is non-rotatable, its upper end being mounted in the top wall of the housing 17 and its lower end being confined in a blind hole formed in the flange 68 within the housing 17. The shaft includes a shoulder 88 bearing against the upper turret to hold the turrets in axial position along the shaft.

The rapid traverse (first stage) gauge carrier, indicated at 30 (FIGURES 3 and 5), comprises a sleeve 90 slidably mounted as at 91 upon a pair of shafts 92—92 for vertical movement. The carrier includes upper and lower cross pieces 93—93 extending across the ends of the sleeve 90, the upper abutment 66 being carried in a block 94 mounted upon the upper cross piece 93. The spirally arranged gauging surfaces or abutment blocks 31 each form a part of respective collars 95, the collars being stacked upon a shaft 96 having upper and lower ends journalled as at 97—97 in the upper and lower cross pieces. The lower end of the shaft 96 includes a fixed collar 98 and its upper end includes a threaded collar 100. The fixed collar rests upon a shoulder 101 formed on shaft 96, while the threaded collar clamps the stacked collars 95 one upon another, with the abutments (gauging surfaces) 31 spirally arranged so that the abutments may be selectively indexed into alignment with the limit switch 28 by rotating the shaft 96. For this purpose, there is fixed to the lower end of shaft 96 a gear 102 which meshes with the dial gear train, as explained later.

It is to be noted at this point, that the first stage carrier 30 (FIGURE 3) is shown in its elevated position for indexing the turrets and abutment carrier with its upper end engaging a boss 99, its lower limit of travel being shown by the position of gear 102 in broken lines. During the indexing cycle, the carrier 30 is first shifted to the elevated position by a crank pin 103 (FIGURES 3 and 14) which is rotated by the dial driving system as explained later. Crank pin 103 includes a link 104 having a lower end which is journalled upon a pin 105. The pin 105 is mounted in a block which is attached to the lower cross piece 93 of carrier 30. The link 104 is slotted to permit downward movement of the link independently of the carrier 30.

During the indexing cycle, the dial motor 43, through operation of the crank pin 103, shifts the carrier 30 (first stage) to its highest elevation to permit rotation of the turrets during gauge selection. At its upper limit as shown in FIGURES 3 and 14, the carrier trips a limit switch 106 which initiates the turret indexing cycle, as explained later. Switch 106 is mounted on a bracket 112 within housing 17, as shown in FIGURE 1. After the rotary one-inch abutments and decimal turrets are indexed, the control apparatus causes rotation of the crank pin 103 to its lowered position so as to lower the carrier 30 and abutment stud 66 into engagement with the stacked gauge rods or shiftable gauging elements. Rotation of the crank is halted by a second limit switch 107 when the crank pin 103 reaches its lowermost position. As seen in FIGURE 14, the crank pin 103 is mounted upon a disk 108 which is carried by a shaft 110, the disk having a notch 111 which trips the switch 107 in the lowered position of the carrier. This operation is described in greater detail later with reference to the control circuit.

The feed gauging turrets 73–76 (second stage) are similar to the rapid advance turrets and the turret shaft 77 (FIGURE 2) is mounted in the housing in a manner similar to the shaft 65. Each turret is also provided with a turret gear 83 for rotating the decimal gauge rods (shiftable gauging elements) to selected positions. The one-inch gauge carrier 34 is similar to the gauge carrier 30, including the sleeve 90, upper and lower cross pieces 92, and 93 and rotatable shaft 96 upon which the one-inch abutments 35 (gauging surfaces) are spirally arranged for selection upon rotation of a gear 113. The sleeve 90 is slidably mounted upon a pair of shafts 114, similar to the shafts 92—92.

As noted earlier, the second stage carrier 34 is spring biased upwardly by a tension spring 82 (FIGURE 2) having its upper end anchored to a stud 115 projecting from the housing wall. The lower end of the spring is anchored to a stud 116 projecting from the lower cross piece 92 of the carrier. When the spindle is in its retracted position, the spring shifts the carrier upwardly into engagement with the end of a boss similar to boss 99 of FIGURE 3, such that the upper cross piece 93 trips a limit switch 117. The limit switch 117 is mounted on a bracket 117a within housing 17 (FIGURES 10 and 11) and is tripped by an angle piece 119 attached to the carrier 34. This limit switch is also inserted in the control circuit to permit rotation of the turrets only when the carrier 34 is in its upper position to provide clearance between the upper and lower abutment studs 78 and 80 for turret rotation. As the spindle and tool as a unit moves downwardly, the end of the depth control rod 18 engages the selected abutment 35 and thus shifts the carrier downwardly, causing the upper abutment stud 78 to act through the stacked gauge rods (shiftable gauging elements) against the lower abutment stud 80, thereby to trip the limit switch 36. The maximum downward position of the carrier is indicated by the broken line position of the gear 113 (FIGURE 2).

Dial Drive Mechanism

As noted earlier, the gauge rods and abutments for the rapid advance and feed motion of the spindle are rotated to the selected position by the dial motor 43, which is in direct driving connection with the shaft 44 (FIGURES 1–5 and 15). Shaft 44 includes a series of clutch gears 118 which provide a driving connection to the turret gears 83 which drive the decimal turrets 64—65 and 73–76 of the rapid traverse and feed depth gauging rods. The clutch gears 118 of shaft 44 are also in driving connection with the rotary abutment carriers 30 and 34, and with individual gears 120 which form a part of the selector switches 57 and dials 27 and 33.

These switches, as explained later, energize the solenoids 61 (FIGURES 6 and 7) which stop the individual dials and turrets in the selected positions. For this purpose, each of the clutch gears 118 is in frictional driving connection with the motor shaft 44, adapting the shaft to continue to rotate as the individual dials and associated turrets are stopped in selected positions. In addition to the frictionally driven clutch gears 118 for the rapid traverse and feed depth gauge rods and abutments, there is also provided a frictionally driven clutch gear 121 (FIGURES 2 and 16) which raises and lowers the rapid traverse abutment carrier 30 during the spindle cycle, as explained later.

As noted earlier, the dial driving system is shown in developed form in FIGURES 2 and 3, the second stage feed depth decimal turrets and one-inch carrier being shown in FIGURE 2 and the first stage rapid advance decimal dials and one-inch carrier being shown on FIGURE 3 as a continuation of FIGURE 2. The dial driving shaft 44, which is journalled in ball bearings 49—49 of the housing 17, is also shown in broken lines in FIGURE 3 to complete the drive to the rapid traverse dials and one-inch abutment carrier. The true relative location of the several shafts and other components is shown in FIGURE 1.

Referring now to FIGURES 6 and 7, each clutch gear 118 is rotatably mounted upon a sleeve 122 which is keyed to the shaft 44 and each clutch gear 118 meshes (FIGURE 1) with a respective turret gear 83 of shaft 77 and also with a respective selector switch gear 120 of shaft 123. During rotation of the shaft 44 by the dial motor, the decimal turrets and abutment carriers are rotated until they are stopped individually at selected positions by the individual solenoids 61, one solenoid being provided for each dial; there is also provided a solenoid for the gear 121 which raises and lowers the rapid traverse gauge carrier 30 (FIGURE 16). Rotation of shaft 44 continues until the last selector switch of the series, including the carrier gear 121, has been rotated to the position determined by its energized contact 59; thereafter, the spindle cycle is initiated, as explained with reference to the circuit diagram.

Described in detail (FIGURES 6 and 7), each selector gear 118 includes a ratchet disk 124 which is pinned as at 125 for rotation with the gear. The sleeve 122 is keyed as at 126 to shaft 44, and each sleeve includes a flange 127 at its lower end. The selector gear 118 frictionally engages a ring 128 carried by flange 127, the gear being urged against the friction ring by a spring-loaded plug 130. Plug 130 is mounted in a bore formed in a holder 131 which is threaded as at 132 upon the upper portion of sleeve 122. A compression spring 133 is seated within the cap 131 and urges the plug 130 against the upper surface of the ratchet wheel 124. Accordingly, the gear 118 rotates with shaft 44 in the direction indicated in FIGURE 6 until the ratchet wheel is latched against further rotation by the associated solenoid 61.

Each solenoid is mounted upon an adjustment plate 134 having one end pivotally connected as at 135 for adjusting motion about the axis of shaft 44, and having a shiftable end 136 adjacent a pair of adjustment shafts 137—137. The plates 134 are locked in adjusted position by respective pairs of nuts 138—138 threaded on the shafts 137. Each solenoid 61 is mounted upon the adjustment plate 134 by means of an angle bracket 140 (FIGURES 6 and 7) and each solenoid includes an armature 141, which is pivotally connected to a latching finger 143. The latching finger is pivotally carried by a stud 144 rising from plate 134 and includes a pawl 145 arranged to engage the teeth 146 of the ratchet wheel 124. The latching finger 143 is normally held in a retracted position by a compression spring 147 having one end seated against an abutment member 148 attached to the plate 134. The opposite end of spring 147 is seated against a lever 150 which forms a part of the latching finger 143. A headed screw 149 forms a stop which limits the motion of lever 150, as indicated by the broken lines.

When the solenoid 61 is deenergized, the compression spring 147 shifts the pawl 145 to a retracted position with respect to the ratchet teeth, thus permitting the gear 118 to be rotated and to rotate the decimal turrets and selector switches to their selected positions, as signalled by the numerical control system. When the energized contact 59 of the respective selector switches are traversed by the associated brushes 60, the solenoid for that dial is energized, thus shifting the pawl 145 to the position shown in FIGURE 6 to arrest the gear 118 in the selected position of the dial. It will be noted that the solenoid and ratchet mechanism for the two rapid advance turrets (first stage) and for the four feed turrets (second stage) are identical to the structure shown in FIGURES 6 and 7. It is also to be noted that, the ratchet wheel 124 is provided with six teeth, while the turrets are each provided with ten measuring positions; however, the ratio between the gear trains, as described below, provides the advancement of one gauge rod upon advancement of one tooth of the ratchet wheel 124. The two teeth of the ratchet wheel 124a (FIGURE 16) provide the up and down positions of the carrier 30 through the ratio of the gear train.

As noted above, the rotary abutment carriers 30 and 34 are also rotated to selected positions under the control of solenoid-actuated selector mechanisms as shown in FIGURES 6 and 7. It will be recalled that the abutment carriers 30 and 34 are rotated to eight selected positions, representing one-inch gauging positions from zero to seven for each rotary position. The ratchet wheels for the abutment selectors are each provided with six teeth and the gear ratio between the dial shaft 44 and abutment carriers is arranged to provide one-eighth revolution for each one-sixth revolution of the ratchet wheel to properly index the abutment carriers.

Referring to FIGURES 3 and 5, the rapid advance (first stage) decimal turrets 64 are driven from the dial shaft 44 by respective gears 151 and 152 which are mounted on the countershaft 153 and which mesh with the turret gears 83. The driving train is completed to the clutch gears 118 of the dial shaft 44 by the gears 154 and 155, which are mounted on a second countershaft 156. Both countershafts are rotatably journalled in ball bearings 157—157 seated in the housing 17.

During rotation of the clutch gear 118 for rotating the lower turret 64, the indexing motion is transmitted from gear 154 to pinion 158 which is pinned as at 160 to countershaft 153, and from the countershaft to gear 151, also pinned to the countershaft 153. The upper turret 64 is rotated to its selected position by a gear 161 which is pinned to the countershaft 156, and meshing with one of the clutch gears 118 of the dial shaft 44. The drive is completed by way of the gear 155, also pinned to the countershaft 156 and through pinion 152, which is loosely journalled on countershaft 153 to the gear 83 of the turret 64.

The abutment carrier 30 is driven from its clutch gear 118 (FIGURE 3) by an idler gear 162 loosely journalled on countershaft 156 and meshing with an idler gear 163 pinned on the countershaft 153. Gear 163 includes a pinion 163a which meshes with a gear 164, as indicated by the broken lines, loosely journalled on the countershaft 165. Gear 164 is confined against endwise motion by collars 166 which are pinned to the countershaft 165. Although gear 164 and countershaft 165 are shown displaced, the countershaft 165 is mounted adjacent countershaft 153, adapting the gears to mesh. The idler gear 164 meshes with a drive gear 167 which is pinned to a countershaft 168 which is journalled in ball bearings 157. The lower end of countershaft 168 includes an elongated gear 170 pinned to the shaft and meshing with the gear 102 (shown in broken lines) which is pinned to the lower end of the one-inch gauge shaft 96, as shown on the left side of FIGURE 3, thus completing the driving train from the clutch gear 118 of the dial drive shaft to the abutment carrier 30. The elongated gear 170 adapts the rapid advance abutment carrier 30 to be shifted to the elevated position shown in full lines in FIGURE 3, while its driving gear 102 remains in mesh with gear 170.

Referring now to FIGURES 2 and 5, the feed depth turrets 73–76 (second stage) are mounted on shaft 77 which is located adjacent the dial shaft 44 (FIGURE 1) such that the turret gears 83 mesh directly with the four lower clutch gears 118, thus providing a direct drive to the turrets. The gears 120 of the selector switches 57 which are mounted on shaft 123, also mesh directly with the clutch gears 118 of shaft 44.

The feed one-inch carrier 34 is indexed by one of the clutch gears 118 which meshes with an idler gear 171 which is loosely journalled on the countershaft 156 (FIGURE 3). Idler 171 drives an idler 169 on shaft 153 and includes a pinion 169a. The pinion 169a in turn, meshes with a driving gear 172 pinned to the shaft 173, which is journalled on ball bearings 157 parallel with the shaft 168. An elongated gear 174 is pinned to the lower portion of shaft 173 and meshes with the gear 113 which is pinned to the lower end of the one-inch carrier shaft 96 of the feed gauge mechanism 32. The elongated gear 174 and gear 113 are shown at the upper end of the gauging apparatus in FIGURE 5 for purposes of illustration; however, its true position is shown in FIGURE 3.

The shaft 173 includes at its lower end an adjustment knob 175 for manual setting of the one-inch abutments or gauging surfaces 35. The shaft further includes a notched disk 176 coacting with a limit switch 177. The limit switch forms no part of the control circuit and has been omitted from the circuit diagrams.

As best shown in FIGURE 3, the crank pin 103 is driven from the lowermost clutch gear 121 by an idler gear 178 rotatably journalled on a stub shaft 180. Gear 178 meshes with a gear 181 which is pinned to a shaft 182, a bevel gear 183 being pinned to the upper end of shaft 182. The crank disk 108 is attached to the horizontal shaft 110 and includes a bevel gear 185 meshing with bevel gear 183. The raising and lowering of the carrier 30 is controlled by the limit switches 106 and 107, as explained later.

Tool Compensating Mechanism

Described with reference to FIGURES 4 and 5, the tool compensating motor 24 is mounted on a housing or stop collar 186 attached to the upper portion of the quill, and is in driving connection with the threaded upper end 25 of the depth control rod 18. As noted earlier, the rod 18 projects downwardly into the housing 17 (FIGURE 13) for coaction with the feed and rapid advance gauging mechanisms. As shown in FIGURE 2, the lower end of rod 118 includes a guide block 187 slidably mounted upon a pair of guide rods 188 (FIGURE 1), the limit switch 28 being mounted upon a bracket 190 which is attached to the guide block 187. The switch 28 is thus shifted along an accurate path with respect to the one-inch gauges 35.

As viewed in FIGURE 4, the stop collar 186 includes a gear housing 191, the motor 24 being attached to the housing by screws 192. A gear 193 is keyed to the motor shaft and meshes with a pinion 194, which is rotatably journalled on ball bearings 195 within the gear housing. The lower sleeve portion of pinion 194 is counterbored as at 196 to provide clearance about the rod 18. A sleeve 197 projects upwardly as a part of pinion 194 and forms a nut in threaded engagement with the threaded portion 125 of control rod 18. Operation of motor 24 thus rotates the sleeve 197, causing the control rod 18 to be raised or lowered, the rod being held against rotation by the guide block 187.

In order to prevent excessive looseness in the screw threads, the nut 197 includes an anti-backlash nut 198, which is also engaged on the screw threaded portion 25 of the rod. This nut includes a key 200 at opposite sides engaging a slot formed across the upper end of nut 197 to prevent relative rotation of sleeve 197 and nut 198. The nut 198 is locked in adjusted position by a pair of locking rings 202 which are threaded upon the external diameter of sleeve 197 and in engagement with the anti-backlash nut 198 to lock it in adjusted position. The threaded portion of control shaft is enclosed by a cap 203 which is secured as at 204 to the upper surface of the gear housing 191.

Spindle Driving System

The spindle drive mechanism does not form a part of the present invention; however, the structure is disclosed diagrammatically in FIGURE 21. The axial feeding motion is imparted to the spindle by the feed box transmission, indicated at 205, which is powered by the shaft 206. Shaft 206 is in driving connection with the spindle speed transmission, so as to relate the axial feeding motion with the spindle speed.

The feed box includes an output shaft 207 which includes a bevel gear 208 meshing with the bevel gear 210 mounted on the vertical shaft 211. Shaft 211 includes at its lower end a bevel gear 212 meshing with a bevel gear 213 of horizontal shaft 214. The horizontal shaft 214 includes a worm 215 which drives a worm wheel 216 mounted on the spindle clutch shaft 217. As seen in FIGURE 8, clutch shaft 217 includes a pinion 218 meshing with a rack 220. The rack is connected to the quill and thus transmits the feeding motion of the feed box to the quill.

In order to provide rapid advancement of the quill and spindle, there is provided a reversible rapid traverse motor 221 belted as at 222 to a pulley 223 keyed to the vertical shaft 211. The motor is powered by the lines 224. Shaft 207 includes an electrically operated rapid traverse clutch 225, controlled by the lines 226, the clutch being disengaged for rapid advancement. During advancement of the spindle through the feed box, clutch 225 is engaged to provide a driving connection from the feed box to the worm 215 for feeding the quill while the rapid traverse motor 221 idles. An electrically operated spindle limit clutch 227 is also interposed in the vertical shaft 211 to decommission the driving connection at the final limit of spindle travel. This clutch is of conventional design and includes electrically controlled friction plates indicated diagrammatically at 228 in FIGURE 8.

At the start of an operating cycle, with the spindle in its retracted position, motor 221 is energized in a direction to advance the quill and spindle at the rapid rate under the control of limit switch 28, as indicated in FIGURE 18. During the rapid advancement, the feed clutch 225 is disengaged to permit rotation of shaft 207 independently of the feed box. The limit clutch 227 is engaged during the rapid traverse and feed advancement of the quill. When the limit switch 28 is tripped, the circuit deenergizes the motor 221 and engages clutch 225, such that the feeding continues in the same direction but at the feed rate as provided by the feed box transmission 205 (FIGURE 19). After the tool is fed in, the circuit causes the electrically operated limit clutch 227 to be disengaged so as to stop the spindle precisely at its lower limit (FIGURE 20).

The lever 81 which trips the final limit switch 36 (FIGURE 9) is pivoted as at 230 closely adjacent the stud 80 to provide a motion increasing action with respect to the microswitch 36 for precise final positioning. The stud or feeler 80 engages the spring loaded plunger 231 which provides a cushioning effect. The lever 81 is normally drawn toward the limit switch by a tension spring 232, the lever 81 includes an adjustment screw 233 for precise adjustment of the apparatus.

There is also provided a safety switch 234 (FIGURE 9) which is mounted above the lever 81 in a position to be tripped should the spindle overtravel its preselected depth through a malfunction of the apparatus. The swinging end of the lever is provided with a second adjustment screw 235 which engages the plunger of the switch upon overtravel.

Referring to FIGURES 1, 9 and 12, the lever 81 is nonrotatably attached to the rock shaft 230, the opposite ends of the shaft being journalled in anti-friction bearings 236—236 (FIGURE 1). The end of rock shaft 230, opposite lever 81, includes a short lever 237 (FIGURE 12) clamped as at 238 to the rock shaft. The outer end of lever 237 includes a pin 240 which engages the actuating element 241 of the dial indicator 37. The element 241 permits the indicator to be set to a given reading so as to provide a reading of the accuracy of tool feed at the end of the feed cycle.

*Gauge Selector Circuit and Operation*

As pointed out earlier, the electrical circuit for regulating the depth gauge apparatus does not form a part of the invention; however, in order to more clearly disclose the operation and sequence of the spindle cycle, a simplified electrical circuit is shown in FIGURES 22 and 23. These views have been placed upon two sheets of drawings in order to provide the necessary space, the horizontal leads of the two views being aligned with one another in order to more readily follow the circuits.

The box labled "main control circuit" represents the programing system disclosed in the aforesaid Knosp et al. application Serial No. 786,589 which provides electrical signals generated by the reader 239 in accordance with coded information carried by a punched tape or the like. As shown in the diagram, the reader signals are transmitted to a memory storage unit 242. The main control circuit, which represents the entire numerical control system, is adapted to automatically control the table and saddle position, the rate of spindle feed (feed box 205—FIGURE 21), and the rate of spindle rotation as disclosed in the aforesaid copending application; the main control also regulates the spindle cycle, tool length compensation and spindle cycle of the present application under tape control.

The several power units of the spindle control apparatus are energized by way of the power lines 243.

As noted with reference to FIGURES 17–20, the spindle resides in a retracted position at the start of a spindle cycle. The control circuit includes a spindle actuated switch 244 which is mounted in the head and arranged to complete a control circuit in the retracted position of the spindle. It will be noted in FIGURE 22 that the leads 245 from the storage unit 242 each represent ten individual lines 146 which energize one selected contact of each decimal selector switch 57, both of the feed depth group (FIGURE 22) and of the rapid advance group (FIGURE 23).

One of the lines 245 also energizes one of the eight contacts of the one-inch carrier switches which are indicated at 247—247 in FIGURES 22 and 23. As explained earlier, the decimal selector switches 57 are each provided with ten contacts representing the digits from zero to nine, while the one-inch selector switches 247 are provided with eight contacts representing the digits from zero to seven. All of the selector switches are shown with the respective brushes 60 in the zero position. The selector switch indicated at 248 (FIGURE 23) represents the two-position switch which controls the up and down position of the rapid advance one-inch carrier 30.

It will be recalled that it is necessary for both the one-inch rapid traverse carrier 30 (first stage) and one-inch feed carrier 34 (second stage) to be shifted to the elevated position before the dials and turrets are indexed, in order to provide clearance for the stacked decimal gauge rods (shiftable gauging elements) between the abutment studs. The safety switch 117 of the feed carrier 34 is tripped at this time because the spindle is retracted and the carrier is elevated by its spring. This switch is interconnected in the control circuit by way of line 249 to signal the up position of the carrier. At the start of the cycle, a circuit is also completed from the memory storage unit by way of line 250 to the upper contact 59 of the one-inch rapid advance carrier switch 248 (FIGURE 23), such that the solenoid 61 of the two-position switch is deenergized (line 252) to hold carrier 30 in its elevated position. The dial motor 43 is also energized at this time. During this operation, the brushes of the one-inch and decimal selector switches 57 are held in stationary position by operation of the friction clutches, their solenoids 61 being energized (line 251), the pawls being engaged with the ratchet teeth (FIGURE 6).

When the carrier 30 is in its elevated position, the brush of carrier switch 248 completes a circuit from its upper contact, line 252, through the brush line 253, which signals the main control circuit that the carrier is elevated. The control circuit in turn sends a signal by way of line 254 to the solenoid 61 which regulates switch 248, thus energizing the solenoid and engaging the pawl so as to hold the crank pin 103 and switch in the up position. The solenoid circuit is completed by way of line 255 which is common to all of the solenoids. The carrier 30 also trips its up limit switch 106 (FIGURE 3) thus completing a circuit from line 256 to line 257 which is interconnected in the main control circuit to signal the up position of carrier 30.

In response to switch 106, the main control circuit deenergizes the solenoids 61 for the decimal one-inch selector switches, while keeping the solenoid of the two-position selector switch 248 energized, thus permitting rotation of the brushes 60 of the one-inch selector switches 247 and decimal switches 57. The memory storage unit 242 now energizes one contact 59 of each switch by way of lines 245 and branch lines 246, so as to select the required one-inch and decimal gauges. As the respective brushes 60 engage the energized contact of each switch, they complete a circuit back to the main control circuit by way of the lines 253, which lead from the brushes. As each of these lines is energized, the main control circuit energizes the respective lines 251 which lead to the solenoids 61 of the individual switches, the circuit being completed through the solenoids by way of the line 255. Thus, as each brush engages the energized contact, the corresponding solenoid is energized to stop the dial and associated turret and gauge carrier in the selected position.

When all of the brushes and gauge carriers have been shifted to the selected positions, the main control circuit is conditioned for the next operation of the sequence, the selected gauge rods (shiftable gauging elements) being in stacked position between the abutments. The memory storage units now sends a signal by way of line 250 and branch line 260 to shift the one-inch gauge carrier 30 (first stage) to its lowered position. Upon receiving this impulse, the main control circuit deenergizes the solenoid 61 of the two-position switch 248, thus rotating crank pin 103 to its lowered position and rotating the brush 60 of switch 248 to the lower contact, thereby energizing its solenoid 61 to engage its ratchet and stop the crank pin. The carrier also closes its down limit switch 107 (disk 108) as previously described with reference to FIGURE 14, thereby completing a circuit from line 256 to line 262 (FIGURE 23), which signals the control circuit that the carrier is down. At this point in the sequence, the dial motor is deenergized and the circuit is ready for spindle advancement.

It will be understood at this point that the gauge rods (shiftable gauging elements) are now stacked between the abutment studs 66 and 67 and 78 and 80, with the selected rapid advance abutment 31 (gauging surface) rotated into alignment with the rapid advance switch 28 (FIGURE 5). At this point, the second stage feed carrier 34 is in its elevated position with its safety switch 117 tripped, and with the feed gauge rods and one-inch gauges set. The main control circuit now energizes the traverse motor 221 (FIGURE 21) by way of lines 261 in a direction to feed the spindle downwardly, the electrical feed clutch 225 being deenergized.

The spindle advances downwardly at the rapid rate until the rapid traverse switch 28 engages the selected abutment 31 of carrier 30. This completes a circuit from line 256 (FIGURE 23) through line 263 to the main control circuit, which then deenergizes the rapid traverse motor 221 and energizes the feed clutch 225, so as to cause continued advancement of the spindle at the feed rate through operation of the feed box 205. At the final position of the spindle, the control rod 18 engages the selected one-inch abutment (gauging surface) of carrier 34, and through the stacked gauge rods (shiftable gauging elements), trips the final position switch 36, thus completing a circuit from line 256 through line 264 to the main control circuit. This circuit deenergizes the final limit clutch 227, thus stopping the spindle. After a time delay, the control circuit deenergizes the feed clutch 225 and energizes the rapid advance motor 221 in a direction to retract the spindle at the rapid rate until spindle limit switch 244 is closed thus ending the cycle.

When a tool change is required, the memory storage unit sends a command signal by way of line 265 to the potentiometer circuit which is indicated by the box 266. The line 265 includes branch lines 267 to the individual potentiometers which are adjusted by the heads 56, as explained earlier, to compensate for the length of each tool. The potentiometer circuit is conventional and has been shown in a simplified form in order to explain the operation generally.

When the tool change is signalled, a circuit is established to the potentiometer, which has previously been set for that particular tool. This circuit is completed by one of the branch lines 268 and line 269 which leads to a chopper or vibrator, comprising a vibrator element 270 which alternately engages the contacts 271 and 272, the vibrator element being energized by the A.C. coil 273. The vibrator element 270 is connected to an amplifier 274, while the contact 272 is connected by way of line 275 to a feed-back potentiometer 276, which is in driving connection with the tool compensating motor 24. The motor is energized by the lines 277 leading from the amplifier. The amplifier is energized by the D.C. lines 278—278.

When the circuit from the storage unit is completed to the selected tool potentiometer, the vibrator element alternately completes two potentiometer comparison circuits. The first circuit (contact 271) transmits the tool potentiometer value to the amplifier; the second circuit (contact 272) transmits the value of the feed-back potentiometer to the amplifier. The amplifier in turn, energizes the compensating motor (lines 277) in a direction which is determined by the two potentiometer values. The apparatus thus operates as a servomechanism until the value of the two potentiometers is equalized and at this point, the compensating motor 24 is deenergized, the depth control rod 18 having been shifted to a position which compensates for the actual length of the new tool. During the compensating cycle, the spindle will thus advance the tool, as indicated at C and D in FIGURES 18 and 19.

As indicated in FIGURE 22, the main control circuit includes two switches 279 and 280, which represent a portion of the table and slide positioning circuits. These switches act as interlocks to prevent the spindle cycle from being initiated until the table and slide have located the work at a final position with respect to the spindle.

Having described our invention, we claim:

1. A control apparatus for regulating the axial motion of a tool spindle, said spindle having power means for advancing and retracting the same axially, said control apparatus comprising, a group of shiftable gauging elements adapted to control the extent of spindle motion from a retracted position, means for shifting said gauging elements to a selected spindle measuring position, a control element connected to said spindle and movable axially in unison therewith relative to said gauging elements, said control element adapted to translate the gauging elements upon axial advancement of the spindle to an extent determined by said gauging elements, said control element adapted to delay the operation of said spindle power means upon translating said gauging elements, thereby to stop the spindle at a predetermined axial position, tool length compensating means interconnecting the spindle with said control element, and power means connected to the tool length compensating means for shifting said control element axially relative to the spindle in an automatic manner, said compensating means adapted to vary the position at which the spindle is stopped by operation of the gauging elements in accordance with the length of the tool which is carried by the spindle.

2. A control apparatus for regulating the axial motion of a tool spindle, said spindle having power means for advancing or retracting the same axially, said control apparatus comprising, a group of shiftable gauging elements adapted to control the extent of spindle motion from a retracted position, means for shifting said gauging elements to a selected spindle measuring position, a control element connected to said spindle and movable axially in unison therewith relative to said gauging elements, said control element adapted to translate the gauging elements upon axial advancement of the spindle to an extent determined by said gauging elements, said control element adapted to delay the operation of said spindle power means upon translating said gauging elements, thereby to stop the spindle at a predetermined axial position, tool length compensating means connected to the control element and adapted to shift said control element axially relative to the spindle, a reversible compensating motor connected to said compensating means and adapted to shift the control element axially in forward or reverse directions relative to said gauging elements and thereby to vary the position at which the spindle is stopped by the gauging elements, and means for regulating said motor in accordance with the length of the tool which is carried by the spindle.

3. A control apparatus for regulating the axial motion of a machine tool spindle, said spindle having power means for advancing the same axially from a retracted position, said control apparatus comprising, a plurality of shiftble gauging elements adapted to provide an additive length measurement, means for shifting said gauging elements to selected gauging positions, a rotary gauge carrier having a plurality of gauging surfaces adapted to provide a second measurement in accordance with the rotary position thereof, a fixed abutment adapted to engage one end of the shiftable gauging elements, a second abutment mounted relative to said rotary gauge carrier and adapted to engage the opposite end of the shiftable gauging surfaces, whereby the gauging surfaces of said carrier coact with the shiftable gauging elements to provide a combined measurement equal to the additive length of the shiftable gauging elements and the selected gauging surface of the carrier, carrier shifter means for shifting said carrier to a retracted position to provide a maximum spacing between said fixed abutment and the opposed abutment which is mounted relative to said carrier, thereby to provide clearance for shifting said shiftable gauging elements to selected gauging positions, a control element connected to said spindle and movable therewith, said control surface adapted to engage the selected gauging surface of the rotary gauge carrier upon movement of the spindle to an extent determined by said selected gauging elements, said control element adapted to decommission the power means of the spindle upon engaging said selected gauging surface, and tool length compensating means connected to the said control element and adapted to shift the same axially relative to the spindle, thereby to compensate for the length of a tool mounted in the spindle.

4. A control apparatus for regulating the axial motion of a machine tool spindle, said spindle having power means for advancing the same axially from a retracted position, said control apparatus comprising, a plurality of shiftable gauging elements adapted to be shifted into alignment with one another to provide an additive length measurement, means for shifting said gauging elements to selected gauging positions, a rotary gauge carrier having a plurality of gauging surfaces spirally arranged on said carrier and adapted to provide a second measurement in accordance with the rotary position thereof, a shiftable frame structure rotatably mounting said rotary gauge carrier, a fixed abutment mounted adjacent said shiftable gauging elements and adapted to engage one end of the aligned shiftable gauging elements, a second abutment mounted upon the shiftable frame structure of the rotary gauge carrier and adapted to engage the opposite end of the aligned gauging elements, whereby the gauging surfaces of the rotary gauge carrier coact with the shiftable gauging elements to provide a measurement composed of the additive length measurement of the aligned gauging elements and selected gauge surface of the rotary gauge carrier, and means for shifting said carrier to a retracted position providing a maximum spacing between said fixed abutment and the opposed abutment which is mounted on said carrier frame structure, thereby to provide clearance for shifting said gauging elements to selected gauging positions.

5. A control apparatus for regulating the axial motion of a machine tool spindle, said spindle having power means for advancing the same axially from a retracted position, said control apparatus comprising, a plurality of rotatable turrets mounted for rotation about a common axis, respective sets of shiftable gauging elements mounted in said turrets and adapted to be shifted into alignment with one another upon rotary motion of said turrets to selected positions, said gauging elements adapted to provide an additive length measurement, a rotary gauge carrier having a plurality of gauging surfaces spirally arranged thereon and adapted to provide a second measurement in accordance with the rotary position thereof, a fixed abutment mounted adjacent said shiftable gauging elements and adapted to engage one end of the aligned gauging elements, a second abutment mounted relative to said rotary gauge carrier and movable therewith, said second abutment adapted to engage the opposite end of the aligned gauging elements, whereby said gauging surfaces coact with the gauging elements to provide a measurement comprising the selected gauging surface and aligned gauging elements, and power means for shifting said carrier to a retracted position providing a maximum spacing between said fixed abutment and the opposed abutment which is mounted relative to said carrier, thereby to provide clearance for shifting said gauging elements to selected gauging positions.

6. A control apparatus for regulating the axial motion of a machine tool spindle, said spindle having power means for shifting the same axially at a rapid rate and at a feed rate, said control apparatus comprising, a plurality of rotatable turrets mounted for rotation about a common axis, respective sets of shiftable gauging elements mounted in said turrets and adapted to be shifted into alignment with one another upon rotation of the turrets to selected positions, said gauging elements adapted to provide an additive length measurement, a rotary gauge carrier having a plurality of gauging surfaces spirally arranged thereon and adapted to provide a second measurement in accordance with the rotary position thereof, a fixed abutment mounted adjacent said gauging elements and adapted to engage one end of the aligned decimal gauging elements, a second abutment mounted relative to said rotary gauge carrier and movable therewith, said second abutment adapted to engage the opposite end of the aligned gauging elements, whereby said gauging surfaces of the rotary gauge carrier coact with the gauging elements to provide a measurement comprising the selected gauging surfaces and aligned gauging elements, and power means for shifting said carrier to a retracted position providing a maximum spacing between said fixed abutment and the opposed abutment which is mounted relative to said carrier, whereby to provide clearance for shifting said gauging elements to selected gauging positions, and driving means interconnecting said power means with said turrets and with said rotary carrier, said power means adapted to shift said gauging elements and said rotary gauge carrier to selected gauging positions after said gauge carrier has been shifted to said retracted position.

7. A control apparatus for regulating the axial motion of a machine tool spindle, said spindle having power means for shifting the same axially at a rapid rate and at a feed rate, said control apparatus comprising, a plurality of rotatable turrets mounted for rotation about a common axis, respective sets of shiftable gauging elements mounted in said turrets and adapted to be shifted into alignment with one another upon rotation of the turrets to selected positions, said gauging elements adapted to provide an additive length measurement, a rotary gauge carrier having a plurality of gauging surfaces spaced from one another, said gauging surfaces being spirally arranged thereon and adapted to provide a second measurement in accordance with the rotary position thereof, a fixed abutment mounted adjacent said gauging elements and adapted to engage one end of the aligned gauging elements, a second abutment mounted relative to said rotary gauge carrier and movable therewith, said second abutment adapted to engage the opposite end of the aligned gauging elements, whereby the gauging surfaces of the rotary gauge carrier coact with the gauging elements to provide a measurement comprising the selected gauging surface and aligned gauging elements, and power means for shifting said carrier to a retracted position providing a maximum spacing between said fixed abutment and the opposed abutment which is mounted relative to said carrier, thereby to provide clearance for shifting said gauging elements to selected gauging positions, and driving means interconnecting said power means with said turrets and with said rotary carrier, said power means adapted to shift said decimal gauges and said rotary gauge carrier to selected gauging positions after said gauge carrier has been shifted to said retracted position, said power means thereafter adapted to advance the said rotary gauge carrier and thereby to bring said abutments into endwise engagement with the aligned gauging elements.

8. A control apparatus for regulating the axial motion of a tool spindle, said spindle having rapid rate power means and feed rate power means, said control apparatus comprising, a plurality of first stage shiftable gauging elements adapted to be shifted relative to one another to provide a measurement, a rotary gauge carrier having a plurality of first stage gauging surfaces, said rotary gauge carrier and shiftable gauging elements adapted to coact to provide a first stage measurement, a plurality of second stage shiftable gauging elements adapted to be shifted relative to one another, a rotary second stage gauge carrier mounted parallel with said first stage carrier and spaced therefrom, said second stage carrier having a plurality of second stage gauging surfaces, said second stage carrier coacting with said second stage shiftable gauging elements and providing a second stage measurement, and a control element connected to said spindle and movable therewith, said control element having a portion disposed between said first and second stage gauge carriers, said rapid rate power means shifting said spindle and control element at a rapid rate from a retracted position of the spindle, said control element adapted to be tripped by one of the gauging surfaces of the first stage carrier and thereby to decommission said rapid rate power means and to commission said feed rate power means at the setting provided by the first stage gauging apparatus.

9. A control apparatus for regulating the axial motion of a tool spindle, said spindle having rapid rate power means and feed rate power means, said control apparatus comprising, a plurality of first stage shiftable gauging elements adapted to be shifted relative to one another to provide a measurement, a rotary gauge carrier having a plurality of first stage gauging surfaces, said rotary gauge carrier and shiftable gauging elements adapted to coact to provide a first stage measurement, a plurality of second stage shiftable gauging elements adapted to be shifted relative to one another, a rotary second stage gauge carrier mounted parallel with said first stage carrier and spaced therefrom, said second stage carrier having a plurality of second stage gauging surfaces, said second stage carrier coacting with said second stage shiftable gauging elements and providing a second stage measurement, and a control element connected to said spindle and movable therewith, said control element having a portion disposed between said first and second stage gauge carriers, said rapid rate power means shifting said spindle and control element at a rapid rate from a retracted position of the spindle, said control element adapted to be tripped by one of the gauging surfaces of the first stage carrier and to decommission said rapid rate power means and to commission said feed rate power means at the setting provided by the first stage gauging elements and the first stage gauging surface, said control element adapted to engage one of the gauging elements of said second stage carrier and to decommission the feed rate power means at the limit of spindle travel.

10. A control apparatus for regulating the axial motion of a tool spindle, said spindle having rapid rate power means and feed rate power means, said control apparatus comprising, a plurality of first stage shiftable gauging elements adapted to be shifted relative to one another to provide a measurement, a rotary gauge carrier having a plurality of first stage gauging surfaces, said rotary gauge carrier and shiftable gauging elements adapted to coact to provide a first stage measurement, a plurality of second stage shiftable gauging elements adapted to be shifted relative to one another, a rotary second stage gauge carrier mounted parallel with said first stage carrier and spaced therefrom, said second stage carrier having a plurality of second stage gauging surfaces, said second stage carrier coacting with said second stage shiftable gauging elements and providing a second stage measurement, and a control element connected to said spindle and movable therewith, said control element having a portion disposed between said first and second stage gauge carriers, said rapid rate power means shifting said spindle and control element at a rapid rate from a retracted position of the spindle, said control element adapted to be tripped by one of the gauging surfaces of the first stage carrier and to decommission said rapid rate power means and to commission said feed rate power means at the setting provided by the first stage gauging elements and first stage gauging surfaces, said control element adapted to engage one of the gauging surfaces of said second stage carrier and to decommission the feed rate power means at the limit of spindle travel, and means for energizing the rapid traverse power means in a reverse direction and thereby to retract the spindle after the same is stopped at said limit of spindle motion.

11. A control apparatus for regulating the axial motion of a tool spindle, said spindle having rapid rate power means and feed rate power means, said control apparatus comprising, a plurality of first stage shiftable gauging elements adapted to be shifted relative to one another and to provide a measurement, a rotary gauge carrier having a plurality of first stage gauging surfaces, said rotary gauge carrier and shiftable gauging elements adapted to coact to provide a first stage measurement, a plurality of second stage shiftable gauging elements adapted to be shifted relative to one another, a rotary second stage gauge carrier mounted parallel with said first stage carrier and spaced therefrom, said second stage carrier having a plurality of second stage gauging surfaces, said second stage carrier coacting with said second stage shiftable gauging elements and providing a second stage measurement, a control element connected to said spindle and movable therewith, said control element having a portion disposed between said first and second stage gauge carriers, said control element adapted to engage one of the gauging surfaces of the first and second stage carriers and to decommisison said rapid rate power means and feed rate power means in sequence during spindle advancement, and tool length compensating means connected to said control element and adapted to shift the same relative to the spindle to compensate for the length of the tool which is mounted therein.

12. In a control apparatus for regulating the axial motion of a tool spindle, a set of first stage rotatable turrets, a plurality of shiftable gauging elements mounted in each of said turrets and adapted to be shifted into alignment with one another, a first stage rotary gauge carrier having a plurality of gauging surfaces, said rotary gauge carrier and rotary turrets adapted to coact to provide a first stage measurement, a set of second stage rotatable turrets, respective sets of second stage shiftable gauging elements mounted in each of said turrets, a second stage gauge carrier mounted parallel with said first stage gauge carrier and spaced therefrom, said second stage carrier having a plurality of second stage gauging surfaces adapted to provide a plurality of measurements, said second stage carrier coacting with said second stage turrets and providing a second stage measurement, a common drive shaft for rotating said first and second stage turrets and gauge carriers, and respective friction clutches mounted upon said common drive shaft and in driving connection with said turrets and gauge carriers, for rotating the same, said friction clutches adapted to arrest said turrets and gauge carriers at selected measuring positions.

13. In a control apparatus for regulating the axial motion of a tool spindle, a set of first stage rotatable turrets, a plurality of shiftable gauging elements mounted in each of said turrets and adapted to be shifted into alignment with one another, a first stage rotary gauge carrier having a plurality of gauging surfaces, said rotary gauge carrier and rotary turrets adapted to coact to provide a first stage measurement, a set of second stage rotatable turrets, respective sets of second stage shiftable gauging elements mounted in each of said turrets, a second stage gauge carrier mounted parallel with said first stage gauge carrier and spaced therefrom, said second stage gauge carrier having a plurality of second stage gauging surfaces mounted thereon and adapted to provide a plurality of measurements, said second stage carrier coacting with said second stage turrets and providing a second stage measurement, a control element connected to said spindle and movable therewith, said control element having a portion disposed between said first and second stage gauge carriers and adapted to engage the gauging surfaces thereof, thereby to control the extent of axial spindle motion, a common drive shaft for rotating said first and second stage turrets and gauge carriers, respective friction clutches mounted upon said common drive shaft and in driving connection with said turrets and gauge carriers, and a respective electrically operated ratchet mechanism in driving connection with each of said friction clutches and adapted to arrest said turrets and gauge carriers at selected measuring positions.

14. In a control apparatus for regulating the axial motion of a tool spindle, a set of first stage rotatable turrets, a plurality of shiftable gauging elements mounted in each of said turrets and adapted to be shifted into alignment with one another, a first stage rotary gauge carrier having a plurality of gauging surfaces, said rotary gauge carrier and rotary turrets adapted to coact to provide a first stage measurement, a set of second stage rotatable turrets, respective sets of second stage shiftable gauging elements mounted in each of said turrets, a second stage gauge carrier mounted parallel with said first stage gauge carrier and spaced therefrom, said second stage carrier having a plurality of second stage gauging surfaces mounted thereon and adapted to provide a plurality of measurements, said second stage carrier coacting with said second stage turrets and providing a second stage measurement, a control element connected to said spindle and movable therewith, said control element having a portion disposed between said first and second stage gauge carriers and adapted to engage the gauging surfaces thereof, thereby to control the extent of axial spindle motion, a selector motor adapted to rotate the said first and second stage turrets and gauge carriers to selected measuring positions, and a tool length compensator motor in driving connection with said control element and adapted to shift the same axially with respect to the gauging surfaces of said first and second stage carriers, thereby to compensate for the length of a tool which is mounted in said spindle.

References Cited in the file of this patent

UNITED STATES PATENTS

| | | |
|---|---|---|
| 2,648,237 | Falconi | Aug. 11, 1953 |
| 2,674,706 | Knosp et al. | Apr. 6, 1954 |
| 2,682,182 | Armitage | June 29, 1954 |
| 2,799,075 | Nichta | July 11, 1957 |
| 2,908,978 | Knosp et al. | Oct. 20, 1959 |
| 2,925,000 | Diener | Feb. 16, 1960 |
| 2,932,088 | Knosp | Apr. 12, 1960 |